(12) United States Patent
Ogawa et al.

(10) Patent No.: US 8,848,069 B2
(45) Date of Patent: Sep. 30, 2014

(54) APPARATUS AND METHOD FOR DECIDING SCANNING PATTERN OF AN IMAGING DEVICE

(75) Inventors: Nobuhiro Ogawa, Tokyo (JP); Tatsuya Yamamoto, Tokyo (JP)

(73) Assignee: Sony Corporation

( * ) Notice: Subject to any disclaimer, the term of this patent is extended or adjusted under 35 U.S.C. 154(b) by 159 days.

(21) Appl. No.: 13/553,907

(22) Filed: Jul. 20, 2012

(65) Prior Publication Data

US 2013/0027588 A1   Jan. 31, 2013

(30) Foreign Application Priority Data

Jul. 29, 2011  (JP) ................. 2011-166673

(51) Int. Cl.
*H04N 5/228* (2006.01)
*H04N 5/232* (2006.01)

(52) U.S. Cl.
CPC ....... *H04N 5/23254* (2013.01); *H04N 5/23267* (2013.01)
USPC ............ 348/222.1; 348/208.4; 348/208.99; 348/208.6; 348/208.16

(58) Field of Classification Search
CPC .................... H04N 5/23267; H04N 5/23254
USPC ............... 348/208.4, 208.99, 208.6, 208.16
See application file for complete search history.

(56) References Cited

U.S. PATENT DOCUMENTS

| | | | | |
|---|---|---|---|---|
| 5,444,482 A | * | 8/1995 | Misawa et al. | 348/220.1 |
| 6,192,077 B1 | * | 2/2001 | Sugiyama | 375/240.12 |
| 6,963,361 B1 | * | 11/2005 | Kawahara et al. | 348/208.99 |
| 7,012,635 B2 | * | 3/2006 | Umeda et al. | 348/208.4 |
| 7,714,890 B2 | * | 5/2010 | Okubo et al. | 348/208.16 |
| 2003/0128753 A1 | * | 7/2003 | Lee et al. | 375/240.2 |
| 2006/0238621 A1 | * | 10/2006 | Okubo et al. | 348/208.99 |
| 2007/0181687 A1 | * | 8/2007 | Fukushima et al. | 235/454 |
| 2010/0020244 A1 | * | 1/2010 | Mitsuya et al. | 348/699 |
| 2010/0208087 A1 | | 8/2010 | Ogawa | |
| 2011/0292997 A1 | * | 12/2011 | An et al. | 375/240.03 |
| 2012/0147201 A1 | * | 6/2012 | Asukabe | 348/208.1 |
| 2012/0263238 A1 | * | 10/2012 | Miyoshi et al. | 375/240.16 |

FOREIGN PATENT DOCUMENTS

JP   2010-193302 A   9/2010

OTHER PUBLICATIONS

"Image Registration Methods: A Survey" Barbara Zitová, Jan Flusser. Image and Vision Computing 21 (2003) 977-1000.

* cited by examiner

*Primary Examiner* — Antoinette Spinks
(74) *Attorney, Agent, or Firm* — Sony Corporation

(57) ABSTRACT

There is provided an image processing apparatus including a distortion component calculation unit calculating a distortion component in a time series, based on an image signal indicating a moving image composed of a frame image, for each of a first region corresponding to the whole frame image, a second region corresponding to one region obtained by dividing the frame image, and a third region corresponding to the other region obtained by dividing the frame image, and a decision unit deciding a scanning pattern of an imaging device having captured the moving image, which the image signal indicates, based on a combination of a correlation of distortion between the second region and the first region and a correlation of distortion between the second region and the third region.

14 Claims, 19 Drawing Sheets

| | MERIT | DEMERIT |
|---|---|---|
| (1) LINEAR EQUATION | EXTREMELY SMALL CALCULATION QUANTITY | ONLY PARALLELOGRAM DISTORTION AND EXPANSION AND CONTRACTION DISTORTION CORRECTABLE |
| (2) REGION PARTITION | SMALL CALCULATION QUANTITY | LOW VECTOR RELIABILITY |
| (3) QUADRATIC EQUATION | CURVE DISTORTION CORRECTABLE | LARGE CALCULATION QUANTITY |
| (4) MESH STRUCTURE | ALL KINDS OF DISTORTION CORRECTABLE | EXTREMELY LARGE CALCULATION QUANTITY |

FIG.1

| | MERIT | DEMERIT |
|---|---|---|
| (1) LINEAR EQUATION | EXTREMELY SMALL CALCULATION QUANTITY | ONLY PARALLELOGRAM DISTORTION AND EXPANSION AND CONTRACTION DISTORTION CORRECTABLE |
| (2) REGION PARTITION | SMALL CALCULATION QUANTITY | LOW VECTOR RELIABILITY |
| (3) QUADRATIC EQUATION | CURVE DISTORTION CORRECTABLE | LARGE CALCULATION QUANTITY |
| (4) MESH STRUCTURE | ALL KINDS OF DISTORTION CORRECTABLE | EXTREMELY LARGE CALCULATION QUANTITY |

FIG.2

|  | CALCULATION AMOUNT | DISTORTION HANDLING | VECTOR RELIABILITY DEGREE |
|---|---|---|---|
| (1) LINEAR EQUATION | ◎ | △ | △ |
| (2) REGION PARTITION | ○ | ◎ | × |
| (3) QUADRATIC EQUATION | △ | ○ | △ |
| (4) MESH STRUCTURE | × | ◎ | △ |

FIG.5

| | CALCULATION AMOUNT | DISTORTION HANDLING | VECTOR RELIABILITY DEGREE |
|---|---|---|---|
| (1) LINEAR EQUATION | ◎ | × | △ |
| (2) REGION PARTITION | ○ | ○ | × |
| (3) QUADRATIC EQUATION | △ | ○ | △ |
| (4) MESH STRUCTURE | × | ○ | △ |

A

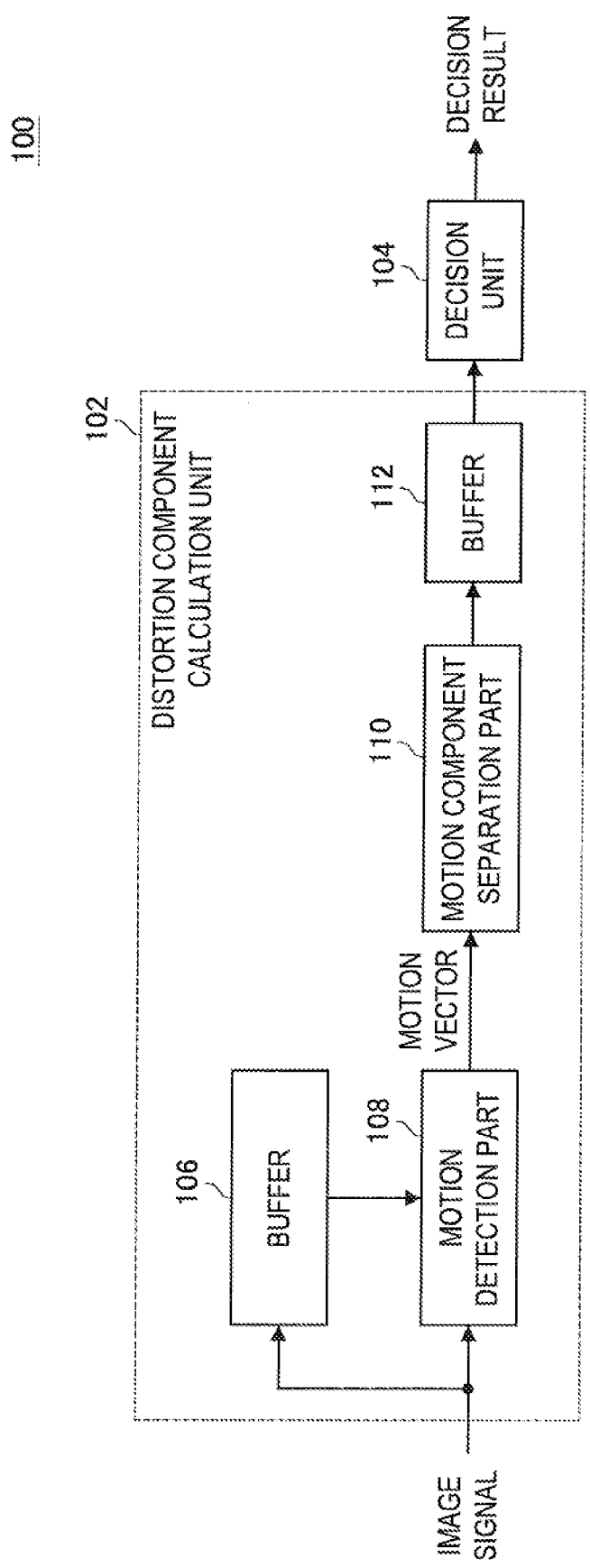

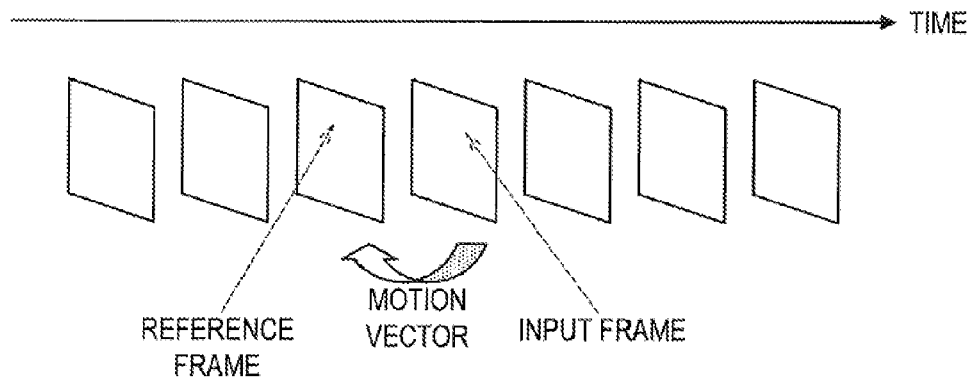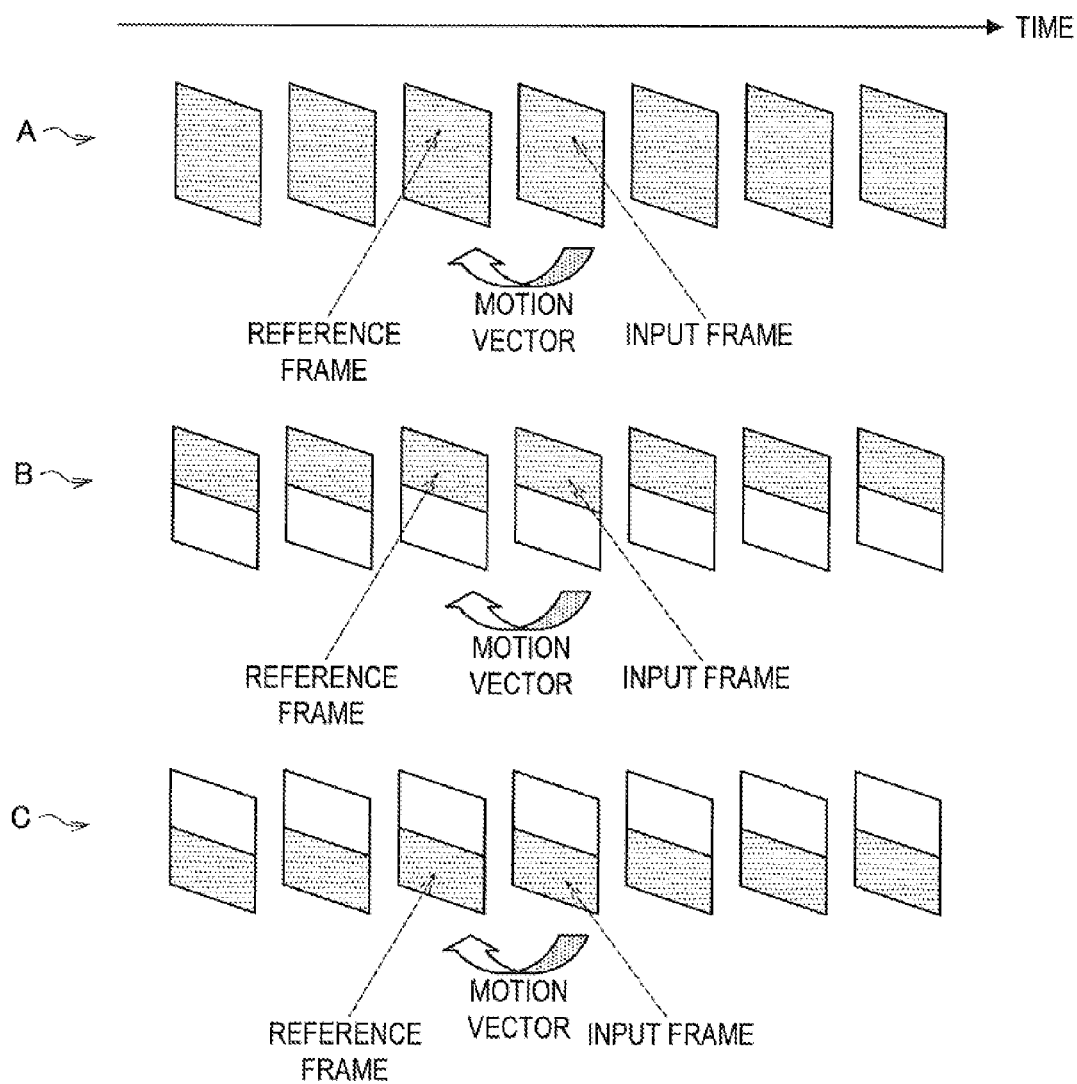

| CORRELATION RESULT TO LOWER FRAME | + | + | + | − | − | − | N | N | N |
|---|---|---|---|---|---|---|---|---|---|
| CORRELATION RESULT TO WHOLE FRAME | + | − | N | + | − | N | + | − | N |
| DECISION RESULT | P | U | 2 | U | U | 1 | U | U | U |
| POSSIBILITY IMPLICATION | − | 2 | − | 1 | 1 | − | P | P | P |

| Track1 | | ▓ | |
|---|---|---|---|
| Track2 | | | |

APPARATUS AND METHOD FOR DECIDING SCANNING PATTERN OF AN IMAGING DEVICE

CROSS-REFERENCE TO RELATED APPLICATION

The present application claims priority from Japanese Patent Application No. JP 2011-166673 filed in the Japanese Patent Office on Jul. 29, 2011, the entire content of which is incorporated herein by reference.

BACKGROUND

The present disclosure relates to an image processing apparatus, an image processing method and a program.

Various instruments, for example, such as a digital still camera and communication devices such as a mobile phone include image capturing functions which allow them to capture moving images in recent years, and therefore, a user is increasingly having opportunities of capturing the moving images. When, for example, CMOS (Complementary Metal Oxide Semiconductor) is used as an imaging device, for example, a rolling shutter method (a method of exposing and sequentially reading out lines) is often employed. When the above-mentioned image capturing functions are realized by, for example, the rolling shutter method, that is, when the imaging device captures the image sequentially for each line, the moving image can suffer from distortion, for example, called focal plane distortion.

Under these circumstances, technologies for reducing the distortion possibly arising in the moving image are developed. Such technologies for reducing the distortion possibly arising in the moving image can include, for example, a technology described in Japanese Patent Application Publication No. 2010-193302, which is hereinafter referred to as Patent Literature 1, and a technology described in Barbara Zitova, Jan Flusser, "Image registration methods: a survey", Image and Vision Computing 21 (2003) 977-1000, (http://library.utia.cas.cz/prace/20030125.pdf), which is referred to as Non Patent Literature 1.

SUMMARY

Methods for reducing the distortion possibly arising in the moving image can include the methods, for example, indicated in items (1) to (4) below.

(1) Method using matrix transform by a linear equation (for example, the technology described in Patent Literature 1)

An image at one frame (hereinafter referred to as a "frame image") is corrected by affine transform using one matrix as a whole.

(2) Method using matrix transform by a linear equation for each partitioned region A frame image is partitioned into plural regions and each partitioned region undergoes the process of item (1) above.

(3) Method using matrix transform by a quadratic equation

The process of item (1) above is extended to a process by a quadratic equation, for example, as indicated in Formula 1 below.

$$\begin{pmatrix} x'^2 \\ x'y' \\ y'^2 \\ x' \\ y' \\ 1 \end{pmatrix} = \begin{pmatrix} a1 & a2 & a3 & a4 & a5 & a6 \\ b1 & b2 & b3 & b4 & b5 & b6 \\ c1 & c2 & c3 & c4 & c5 & c6 \\ d1 & d2 & d3 & d4 & d5 & d6 \\ e1 & e2 & e3 & e4 & e5 & e6 \\ 0 & 0 & 0 & 0 & 0 & 1 \end{pmatrix} \begin{pmatrix} x^2 \\ xy \\ y^2 \\ x \\ y \\ 1 \end{pmatrix}$$ (Formula 1)

(4) Method Using Registration with a Mesh Structure

A frame image is demarcated into unit grids vertically and horizontally and the individual unit grids (rectangles) undergo different kinds of deformation from one another. The method of the deformation can include a method of calculating transformation expressions for the deformation by performing feature point extraction, for example, as described in Non Patent Literature 1.

FIG. 1 and FIG. 2 are explanatory drawings of features of the methods for reducing the distortion indicated in items (1) to (4). FIG. 1 presents the merits and the demerits of the methods for reducing the distortion indicated in items (1) to (4) above. FIG. 2 presents the evaluations of the methods for reducing the distortion indicated in items (1) to (4) above, categorizing into 3 items of a calculation quantity, distortion handling and a vector reliability degree. FIG. 2 exemplarily presents each of the above-mentioned 3 evaluation items for the methods for reducing the distortion indicated in items (1) to (4) above, further categorizing into grades of "excellent", "good", "fair" and "poor" (from excellent to poor). As presented in FIG. 1 and FIG. 2, each method for reducing the distortion has its merits and demerits.

FIG. 3 is an explanatory drawing of one example of a relation between a resolution and a data quantity (YUV422 conversion). The resolution of images is being improved from the SD (Standard Definition) resolution to the HD (High Definition) resolution and further to 4K and the like in recent years. Along with the improvement of the resolution, the data quantity of the images is also increasing drastically as illustrated in FIG. 3. Therefore, the more the resolution of images which an image capturing apparatus capturing moving images can capture improves, the higher the extent to which communication speed in a bus inside the image capturing apparatus is called for becomes. Thus, it also becomes necessary that the imaging device side such as CMOS deals with this situation.

FIG. 4 is an explanatory drawing of one example which the imaging device side deals with. Portion A indicated in FIG. 4 presents the past scanning pattern in which imaging element arrays disposed into a matrix shape are read out line-by-line in a certain direction. Portion B indicated in FIG. 4 presents one example of a new scanning pattern in which imaging element arrays disposed into a matrix shape are read out line-by-line in two directions. For example, by using the scanning pattern indicated in portion B of FIG. 4, the scanning can complete in a half time period compared with that for the past scanning pattern indicated in portion A of FIG. 4. Therefore, it is assumed that different image capturing apparatuses capturing moving images will employ different reading-out methods (scanning patterns), for example, illustrated in FIG. 4, as the resolution of the images which the image capturing apparatuses can capture improves.

Herein, as the scanning pattern changes, the type of the distortion possibly arising in the moving image captured changes. Therefore, the relations between the methods for reducing the distortion, for example, indicated in (1) to (4) above and the distortion handling are also to change compared with the relations indicated in FIG. 2. FIG. 5 presents one example of evaluations of the methods for reducing the distortion indicated in items (1) to (4) above, categorizing into 3 items of a calculation quantity, distortion handling and a vector reliability degree, in the case where the scanning pattern illustrated in portion B of FIG. 4 is employed. FIG. 5 presents an example of evaluations regarding each of the above-mentioned 3 evaluation items for the methods for reducing the distortion indicated in items (1) to (4) above, further categorizing into 4 grades of "excellent", "good", "fair" and "poor" (from excellent to poor).

As indicated in portion A of FIG. 5, it is difficult to correct the distortion by means of the method using matrix transform by a linear equation indicated in item (1) above, in the case where the scanning pattern indicated in portion B of FIG. 4 is employed. Therefore, the post-process for reducing the distortion possibly arising in the moving image is desirable to include correction corresponding to the distortion due to the scanning pattern of the imaging device, having captured the moving image, after the scanning pattern is specified. Hence, a method for deciding the scanning pattern of the imaging device having captured the moving image has been desired.

The present disclosure proposes an image processing apparatus, an image processing method and a program which are novel and improved, and which can decide the scanning pattern of the imaging device having captured the moving image based on the image signal indicating the moving image.

According to the present disclosure, there is provided an image processing apparatus including: a distortion component calculation unit calculating a distortion component in a time series, based on an image signal indicating a moving image composed of a frame image, for each of a first region corresponding to the whole frame image, a second region corresponding to one region obtained by dividing the frame image and a third region corresponding to the other region obtained by dividing the frame image; and a decision unit deciding a scanning pattern of an imaging device having captured the moving image, which the image signal indicates, based on a combination of a correlation of distortion between the second region and the first region and a correlation of distortion between the second region and the third region.

Moreover, according to the present disclosure, there is provided an image processing method including: calculating a distortion component in a time series, based on an image signal indicating a moving image composed of a frame image, for each of a first region corresponding to the whole frame image, a second region corresponding to one region obtained by dividing the frame image and a third region corresponding to the other region obtained by dividing the frame image; and deciding a scanning pattern of an imaging device having captured the moving image, which the image signal indicates, based on a combination of a correlation of distortion between the second region and the first region and a correlation of distortion between the second region and the third region.

Moreover, according to the present disclosure, there is provided a program causing a computer to execute: calculating a distortion component in a time series, based on an image signal indicating a moving image composed of a frame image, for each of a first region corresponding to the whole frame image, a second region corresponding to one region obtained by dividing the frame image and a third region corresponding to the other region obtained by dividing the frame image; and deciding a scanning pattern of an imaging device having captured the moving image, which the image signal indicates, based on a combination of a correlation of distortion between the second region and the first region and a correlation of distortion between the second region and the third region.

According to the present disclosure, the scanning pattern of the imaging device having captured the moving image can be decided based on the image signal indicating the moving image.

BRIEF DESCRIPTION OF THE DRAWINGS

FIG. 1 is an explanatory drawing of features of methods for reducing distortion indicated in items (1) to (4);

FIG. 2 is an explanatory drawing of features of the methods for reducing the distortion indicated in items (1) to (4);

FIG. 4 is an explanatory drawing of one example which an imaging device side deals with;

FIG. 5 presents one example of evaluations of the methods for reducing the distortion indicated in items (1) to (4) above, categorizing into 3 items of a calculation quantity, distortion handling and a vector reliability degree, in a case where a scanning pattern illustrated in portion B of FIG. 4 is employed;

FIG. 6 is a block diagram illustrating one example of a configuration of an image processing apparatus according to a first embodiment;

FIG. 7 is an explanatory drawing of one example of a basic process of a motion detection process in a motion detection part of the image processing apparatus according to the first embodiment;

FIG. 8 is an explanatory drawing of one example of the motion detection process in the motion detection part of the image processing apparatus according to the first embodiment;

DETAILED DESCRIPTION OF THE EMBODIMENT(S)

Figure 3:
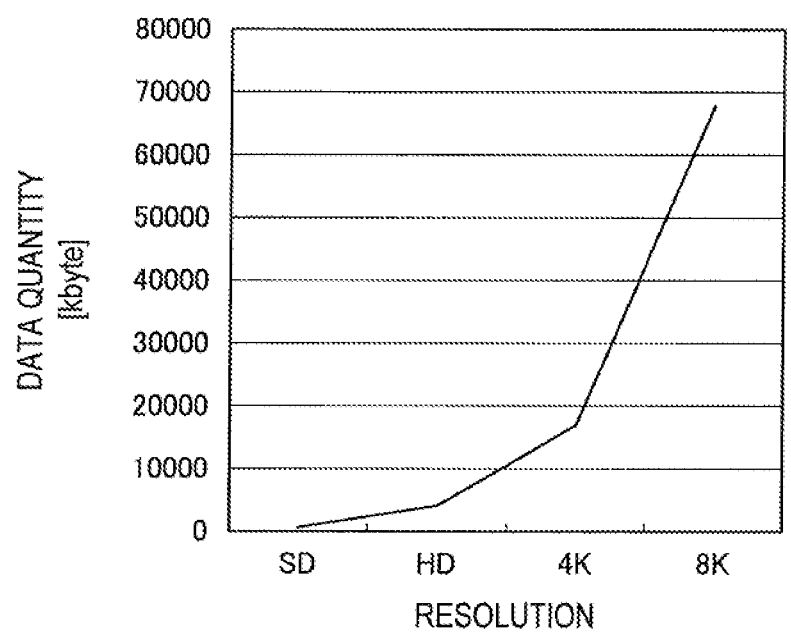
FIG. 3 is an explanatory drawing of one example of a relation between a resolution and a data quantity (YUV422 conversion)

Hereinafter, preferred embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

Moreover, the following items will be described in this order hereinafter.

1. Image Processing Method According to Present Embodiments
2. Image Processing Apparatus According to First Embodiment
3. Image Processing Apparatus According to Second Embodiment
4. Image Processing Apparatus According to Third Embodiment
5. Image Processing Apparatus According to Fourth Embodiment
6. Image Processing Apparatus According to Fifth Embodiment
7. Image Processing Apparatus According to Sixth Embodiment
8. Image Processing Apparatus According to Seventh Embodiment
9. Program According to Present Embodiments

Image Processing Method According to Present Embodiments

An image processing method according to the present embodiments is described before configurations of image processing apparatuses according to the present embodiments are described. Moreover, it is hereinafter supposed that the image processing apparatuses according to the present embodiments perform processes according to the image processing method according to the present embodiments in the following description.

Moreover, it is hereinafter supposed that the image processing apparatuses according to the present embodiments process image signals indicating moving images composed of frame images (still images) in the following description. Herein, the frame image according to the present embodiments is an image corresponding to one frame of, for example, a moving image (corresponding to one field in the case where the moving image is an interlace image), and an image processing apparatus 100 is supposed to process the image signal inputted for every one frame chronologically. Moreover, an image size and/or a color format of the frame image according to the present embodiments are not necessarily specified, whereas the frame image according to the present embodiments is hereinafter supposed to be, for example, an uncompressed image signal in the following description. In addition, the image signal according to the present embodiments may include, for example, attached information indicating the image size, the color format, time stamp, information of the image capturing apparatus having captured the image, and the like.

Moreover, decision of a scanning pattern of the imaging device for an entirety of an image sequence by the image processing apparatus according to the present embodiments is hereinafter exemplarily described. In the above case, when the image processing apparatus performs correction of distortion after the decision such a process by the image processing apparatus means a so-called two-pass process. In addition, the process by the image processing apparatus according to the present embodiments is not limited to the above. For example, the image processing apparatus according to the present embodiments may perform decision of a scanning pattern of the imaging device based on, for example, frame images within a fixed length of frames (for example, 30 frames corresponding to one second). In the above case, when the image processing apparatus performs correction of distortion after each decision the image processing apparatus can realize a so-called one-pass process.

The image signal according to the present embodiments can herein include, for example, a signal indicating an moving image obtained by a user capturing using the image capturing apparatus (analog signal/digital signal), whereas the image signal according to the present embodiments is not limited to the above. For example, the image signal according to the present embodiments may include a signal indicating a moving image captured by the image capturing apparatus loaded in a vehicle or the like or a moving image captured by the image capturing apparatus, which is installed in a fixed location, such as a so-called security camera.

Moreover, the image signal according to the present embodiments can include, for example, an image signal obtained by the image processing apparatus according to the present embodiments receiving (directly or indirectly via a set-top box or the like) and decoding a broadcast wave transmitted from a television tower or the like. Moreover, the image processing apparatus according to the present embodiments can process an image signal transmitted from an external instrument, for example, via a network (or directly). Moreover, the image processing apparatus according to the present embodiments may process an image signal obtained by decoding image data stored in, for example, a storage unit (mentioned later), an external recording medium removable from the image processing apparatus according to the present embodiments, or the like. Further, in the case where the image processing apparatus according to the present embodiments includes an image capturing unit which can capture the moving image (a device corresponding to the above-mentioned image capturing apparatus; mentioned later) or where the image processing apparatus according to the present embodiments functions as an image capturing apparatus, the image processing apparatus according to the present embodiments may process, for example, an image signal corresponding to a moving image captured by the image capturing unit.

The image processing apparatus according to the present embodiments decides the scanning pattern of the imaging device having captured the moving image based on the image signal indicating the moving image composed of the frame images. More specifically, the image processing apparatus according to the present embodiments performs, for example, processes of item (I) and processes of item (II) below.

(I) Distortion Component Calculation Processes

The image processing apparatus according to the present embodiments calculates distortion components in a time series for each of a first region corresponding to the whole frame image, a second region corresponding to one region obtained by dividing the frame image and a third region corresponding to the other region obtained by dividing the frame image based on the image signal. Moreover, the image processing apparatus according to the present embodiments can calculate motion components in a time series based on the image signal. One example of calculation methods of the distortion components and motion components is mentioned later.

Hereinafter exemplarily described is the case where the second region is the upper half region of the frame image obtained by bisection in the horizontal direction and where the third region is the lower half region of the frame image obtained by the bisection in the horizontal direction. In addition, relationship between the second region and third region is not limited to the above, and there may be, for example, another case where the second region is the lower half region of the frame image obtained by bisection in the horizontal direction and where the third region is the upper half region of the frame image obtained by the bisection in the horizontal direction.

Moreover, the distortion components according to the present embodiments can include, for example, distortion components in the horizontal direction and distortion components in the vertical direction. Hereinafter, the distortion components of the first region in the horizontal direction are indicated by "B[ ]", where "[ ]" denotes a linear array having n components; similarly hereinafter, and the distortion components of the first region in the vertical direction by "E[ ]". Moreover, the distortion components of the second region in the horizontal direction are hereinafter indicated by "Bu[ ]", and the distortion components of the second region in the vertical direction by "Eu[ ]", the distortion components of the third region in the horizontal direction are hereinafter indicated by "Bl[ ]" and the distortion components of the third region in the vertical direction by "El[ ]".

(II) Decision Processes

The image processing apparatus according to the present embodiments decides the scanning pattern of the imaging device having captured the moving image which the image signal indicates based on results of correlation based on the calculated distortion components. Herein, the image processing apparatus according to the present embodiments decides the scanning pattern of the imaging device based on, for example, a combination of the result of correlation of distortion between the second region and first region and the result of correlation of distortion between the second region and third region. Moreover, the image processing apparatus according to the present embodiments may decide the scanning pattern of the imaging device based on, for example, a combination of the result of correlation of distortion between the third region and first region and the result of correlation of distortion between the third region and second region. Hereinafter exemplarily described is the case where the image processing apparatus according to the present embodiments decides the scanning pattern of the imaging device based on a combination of the result of correlation of distortion between the second region and first region and the result of correlation of distortion between the second region and third region.

More specifically, the image processing apparatus according to the present embodiments decides the scanning pattern of the imaging device by, for example, comparing data indicating the results of correlation of distortion for individual scanning patterns of the known imaging devices (for example, a table) with the combination of the results of correlation based on the calculated distortion components. Specific examples of the decision method by the image processing apparatus according to the present embodiments are described later.

The image processing apparatus according to the present embodiments decides the scanning pattern of the imaging device having captured the moving image which the image signal indicates based on the image signal by, for example, performing the processes of item (I) above (distortion component calculation processes) and the processes of item (II) above (decision processes). Herein, the image processing apparatus according to the present embodiments decides the scanning pattern of the imaging device by, for example, comparing data indicating the results of correlation of distortion for individual scanning patterns of the known imaging devices with the results of correlation based on the calculated distortion components. Therefore, the image processing apparatus according to the present embodiments can decide the scanning pattern of the imaging device based on the image signal more accurately.

Hereinafter, while one example of a configuration of the image processing apparatus according to the present embodiments is described, specific examples of processes according to the image processing method according to the present embodiments are also described.

Image Processing Apparatus According to First Embodiment

FIG. 6 is a block diagram illustrating one example of a configuration of an image processing apparatus 100 according to a first embodiment. The image processing apparatus 100 includes, for example, a distortion component calculation unit 102 and a decision unit 104.

Moreover, the image processing apparatus 100 may include, for example, a control unit (not shown), a ROM (Read Only Memory; not shown), a RAM (Random Access Memory; not shown), a storage unit (not shown), an operation unit (not shown) operable by a user, a display unit (not shown) displaying various screens on a display screen, a communication unit (not shown) for communicating with external instruments, an image capturing unit (not shown), and the like. The image processing apparatus 100 connects, for example, the above-mentioned individual components via a bus as a transmission line of data.

Herein, the control unit (not shown) is configured to include, for example, an MPU (Micro Processing Unit), various kinds of processing circuits and the like to control the image processing apparatus 100 as a whole. Moreover, the control unit (not shown) may serve as, for example, the distortion component calculation unit 102 (or part of the configuration of the distortion component calculation unit 102) and the decision unit 104. Moreover, the control unit (not shown) can also serve as, for example, a correction unit (not shown) correcting the image signal based on decision results of the decision unit 104. Further, for example, the control unit (not shown) may perform, on the image signal obtained by correction processing, processes of such as encoding the image signal obtained by the correction processing to store in the storage unit (not shown), and causing the display unit (not shown) and/or an external display to display an image indicated by the image signal on its display screen.

The ROM (not shown) stores control data such as a program used by the control unit (not shown) and operation parameters. The RAM (not shown) temporarily stores the program executed by the control unit (not shown) and the like.

The storage unit (not shown) serves as storage means included in the image processing apparatus 100, and for example, stores various data such as image data and applications. Herein, as the storage unit (not shown), for example, a magnetic recording medium such as a hard disk (Hard Disk), an EEPROM (Electrically Erasable and Programmable Read Only Memory), and a nonvolatile memory such as a flash memory can be employed. Moreover, the storage unit (not shown) may be removable from the image processing apparatus 100.

As the operation unit (not shown), for example, buttons, cursor keys, a rotational selector such as a jog dial, or a combination of these can be employed. Moreover, the image processing apparatus 100 can be connected to, for example, operation input devices as external instruments of image processing apparatus 100 (for example, a keyboard, a mouse and the like).

As the display unit (not shown), for example, a Liquid Crystal Display (LCD), and an organic ElectroLuminescence display, which is also referred to as an OLED display (Organic Light Emitting Diode display), can be employed. In addition, the display unit (not shown) may be a device capable of displaying and undergoing operations by the user such as a touch screen. Moreover, the image processing apparatus 100 can be connected to a display device as an external instrument of the image processing apparatus 100 (for example, an external display or the like) regardless of the presence or absence of the display unit (not shown).

The communication unit (not shown) serves as communication means included in the image processing apparatus 100, and communicates with external instruments via a network (or directly) in a wireless/wired manner. Herein, as the communication unit (not shown), for example, a communication antenna and RF (Radio Frequency) circuit (wireless communication), an IEEE802.15.1 port and transceiver circuit (wireless communication), an IEEE802.11b port and transceiver circuit (wireless communication), or a LAN (Local Area Network) terminal and transceiver circuit (wired communication) can be employed. Moreover, as a network according to the present embodiments, for example, a wired network such as a LAN and a WAN (Wide Area Network), a wireless network such as a wireless LAN (WLAN; Wireless Local Area Network), a wireless WAN (WWAN; Wireless Wide Area Network) via a base station, or the Internet using a communication protocol such as a TCP/IP (Transmission Control Protocol/Internet Protocol) can be employed.

The image capturing unit (not shown) plays the role of capturing still images or moving images. When including the image capturing unit (not shown), the image processing apparatus 100 can process, for example, the image signal generated by the capturing of the image capturing unit (not shown).

Herein, as the image capturing unit (not shown) according to the present embodiments, for example, an image capturing device constituted of a lens/imaging device and a signal processing circuit can be employed. The lens/imaging device is, for example, constituted of an optical lens and an image sensor using plural imaging devices such as CMOS. However, the signal processing circuits includes, for example, an AGC (Automatic Gain Control) circuit and an ADC (Analog to Digital Converter), and converts an analog signal generated by the imaging device into a digital signal (image data) to perform various kinds of signal processing. As the signal processing performed by the signal processing circuit, for example, white balance correction processing, color tone correction processing, gamma correction processing, YCbCr conversion processing, and edge enhancement processing can be employed.

Hereinafter, while an example of a configuration of the image processing apparatus 100 according to the first embodiment illustrated in FIG. 6 is described, one example of processes in the image processing apparatus 100 (processes according to the image processing method) is described.

The distortion component calculation unit 102 includes, for example, a buffer 106, a motion detection part 108, a motion component separation part 110 and a buffer 112, and initiatively plays the role of performing the processes of item (I) above (distortion component calculation processes). Hereinafter, each of the buffer 106, motion detection part 108, motion component separation part 110 and buffer 112 constituting the distortion component calculation unit 102 is specifically described.

[Buffer 106]

The buffer 106 plays the role of accumulating a certain number of frame images and accumulates the inputted frame images which are hereinafter referred to as "input frame images" or "input frames" simply. Herein, the buffer 106 plays the role of a queue, for example, in a FIFO (First-In First-Out) manner. Namely, upon accumulation of the frame images during the certain number of frames, the buffer 106 discards the frame image at the oldest frame when a frame image at a next new frame is inputted. Herein, the number of the frames accumulated in the buffer 106 is determined according to the number of frames, for example, used in processes in the motion detection part 108. Hereinafter, the frame image accumulated in the buffer 106 is possibly referred to as a "reference frame image" or a "reference frame" simply.

[Motion Detection Part 108]

The motion detection part 108 performs motion detection in the input frame image using the input frame image and reference frame image.

At first, a basic motion detection process in the motion detection part 108 is described. FIG. 7 is an explanatory drawing of one example of a basic process of the motion detection process in the motion detection part 108 of the image processing apparatus 100 according to the first embodiment. Herein, the plural reference frame images may be used, whereas the reference frame image corresponding to previous one frame from the input frame image is used for the simplest motion detection process. In the case above, a motion vector is defined as a motion from the input frame image to the reference frame image and the motion vector is represented by 6 affine parameters, for example, as indicated in Formula 2 below, this meaning that its third row is fixed to 001. Herein, one set of the affine parameters is determined for each frame and the set of the affine parameters is hereinafter referred to as a "GMV" (Global Motion Vector).

$$\begin{pmatrix} x' \\ y' \\ 1 \end{pmatrix} = \begin{pmatrix} a_1 & a_2 & a_0 \\ b_1 & b_2 & b_0 \\ 0 & 0 & 1 \end{pmatrix} \begin{pmatrix} x \\ y \\ 1 \end{pmatrix} \qquad \text{(Formula 2)}$$

Since one motion vector corresponds to one frame, the motion detection part 108 detects the motion in the input frame image by calculating the motion vector. Hereinafter, the motion vector is possibly referred to as a "global motion".

Herein, as a method for calculating the global motion, proposed is, for example, a method in which one frame is partitioned into some rectangular blocks, a motion vector for each block (referred to as a local motion corresponding to the global motion) is calculated, and the motion vector for each block undergoes filtering. More specifically, the global motion can be calculated, for example, using a technology described in Japanese Patent Application Publication No. 2009-065332 or a technology described in Japanese Patent Application Publication No. 2009-065333 according to the applications of the Applicants.

The motion detection part 108 performs the above-mentioned motion detection process on each of a first region corresponding to the whole frame image, a second region corresponding to one region obtained by dividing the frame image and a third region corresponding to the other region obtained by dividing the frame image.

FIG. 8 is an explanatory drawing of one example of the motion detection process in the motion detection part 108 of the image processing apparatus 100 according to the first embodiment. Portion A illustrated in FIG. 8 indicates one example of the motion detection process on the first region. Moreover, portion B illustrated in FIG. 8 indicates one example of the motion detection process on the second region, and portion C illustrated in FIG. 8 indicates one example of the motion detection process on the third region.

The motion detection part 108 performs the above-mentioned basic motion detection process on each of the first region, second region and third region to calculate the motion vectors corresponding to the first region, second region and third region, respectively.

[Motion Component Separation Part 110]

The motion component separation part 110 separates the inputted motion vector of the affine parameters into a motion component and a distortion component using a model indicated in Formula 3 below (hereinafter referred to as a "component separation expression"). Herein, component separation in the motion component separation part 110 is performed on the motion vector corresponding to each of the first region (a whole frame), second region (for example, an upper half of the frame) and third region (for example, a lower half of the frame).

$$\begin{pmatrix} x' \\ y' \\ 1 \end{pmatrix} = \begin{pmatrix} A_1 & A_2 & A_0 \\ B_1 & B_2 & B_0 \\ 0 & 0 & 1 \end{pmatrix} \begin{pmatrix} x \\ y \\ 1 \end{pmatrix} = \begin{pmatrix} 1 & 0 & h_c \\ 0 & 1 & v_c \\ 0 & 0 & 1 \end{pmatrix} \begin{pmatrix} \frac{1}{p} & 0 & 0 \\ 0 & 1 & 0 \\ 0 & 0 & 1 \end{pmatrix} \qquad \text{(Formula 3)}$$

$$\begin{pmatrix} 1 & 0 & 0 \\ 0 & e & 0 \\ 0 & 0 & 1 \end{pmatrix} \begin{pmatrix} 1 & b & 0 \\ 0 & 1 & 0 \\ 0 & 0 & 1 \end{pmatrix} \begin{pmatrix} 1 & 0 & h \\ 0 & 1 & v \\ 0 & 0 & 1 \end{pmatrix} \begin{pmatrix} \cos\theta & -\sin\theta & 0 \\ \sin\theta & \cos\theta & 0 \\ 0 & 0 & 1 \end{pmatrix}$$

$$\begin{pmatrix} s & 0 & 0 \\ 0 & s & 0 \\ 0 & 0 & 1 \end{pmatrix} \begin{pmatrix} p & 0 & 0 \\ 0 & 1 & 0 \\ 0 & 0 & 1 \end{pmatrix} \begin{pmatrix} 1 & 0 & -h_c \\ 0 & 1 & -v_c \\ 0 & 0 & 1 \end{pmatrix} \begin{pmatrix} x \\ y \\ 1 \end{pmatrix}$$

The set of the affine parameters, which the motion component separation part 110 receives from the motion detection part 108, is constituted of, for example, 6 parameters as indicated in Formula 4 below.

$$\begin{pmatrix} A_1 & A_2 & A_0 \\ B_1 & B_2 & B_0 \\ 0 & 0 & 1 \end{pmatrix} \qquad \text{(Formula 4)}$$

The motion component separation part 110 factorizes the affine parameters indicated in Formula 4 into a plurality of matrices as indicated in Formula 3.

At first, the individual matrices indicated in Formula 3 are described.

(A) Origin Correction Matrix

The matrices indicated in Formula 5 and Formula 6 below, which are at both ends of the component separation expression indicated in Formula 3, are origin correction matrices. Herein, the matrix indicated in Formula 5 indicates a matrix for shifting the origin from the upper left of the frame to the center of the frame. And also, the matrix indicated in Formula 6 indicates a matrix for returning the origin from the center of the frame to the upper left of the frame. The value "$h_c$" indicated in Formula 5 and Formula 6 is set to a value of a half of the width of the frame image in the horizontal direction. The value "$v_c$" in Formula 5 and Formula 6 is set to a value of a half of the width of the frame image in the vertical direction.

$$\begin{pmatrix} 1 & 0 & h_c \\ 0 & 1 & v_c \\ 0 & 0 & 1 \end{pmatrix} \qquad \text{(Formula 5)}$$

$$\begin{pmatrix} 1 & 0 & -h_c \\ 0 & 1 & -v_c \\ 0 & 0 & 1 \end{pmatrix} \qquad \text{(Formula 6)}$$

Figure 9:
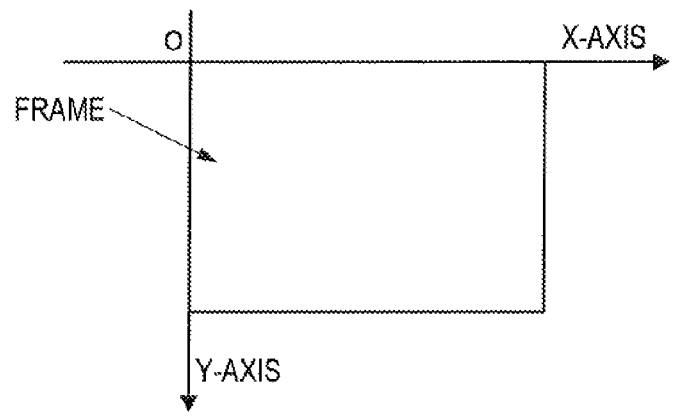
FIG. 9 is an explanatory drawing of one example of a coordinate system.

Herein, it is an issue where to set the center coordinates in the image when performing the component separation of the motion detected by the motion detection. FIG. 9 is an explanatory drawing of one example of a coordinate system. For example, software for the process usually employs the coordinate system in which the upper left of the frame is set to the origin O as illustrated in FIG. 9. When the image processing apparatus 100 employs the coordinate system illustrated in FIG. 9, the affine parameters generated by the motion detection part 108 also correspond to a matrix according to the coordinate system illustrated in FIG. 9.

Figure 10:
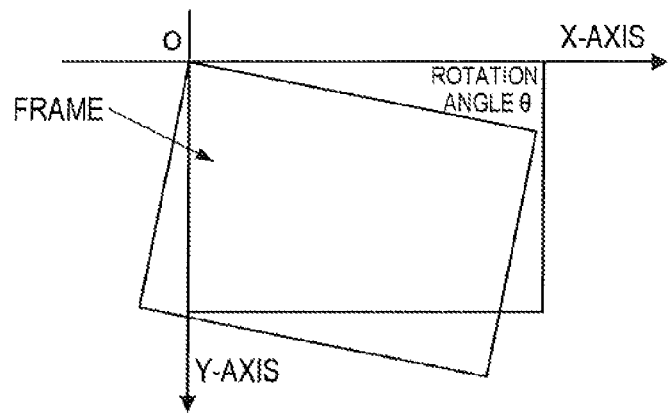
FIG. 10 is an explanatory drawing of one example of a process when a motion component separation part of the image processing apparatus according to the first embodiment employs the coordinate system illustrated in FIG. 9.

FIG. 10 is an explanatory drawing of one example of the process when the motion component separation part 110 of the image processing apparatus 100 according to the first embodiment employs the coordinate system illustrated in FIG. 9. For example, it is assumed that the motion component separation part 110 performs the component separation as in the coordinate system illustrated in FIG. 9 to acquire a rotation component and remove a blur component in the moving image based on the rotation component to stabilize the moving image. In that case, as illustrated in FIG. 10, the rotation around the upper left of the frame image as the center is to be stabilized. Therefore, the center coordinates during more efficient stabilization of the rotation is desirable to be set to the center of the frame image rather than the upper left of the frame, for example, as illustrated in FIG. 9.

Figure 11:
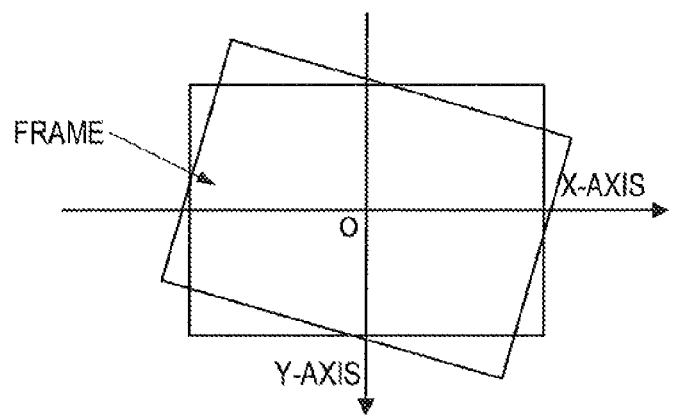
FIG. 11 is an explanatory drawing of one example of a coordinate system used in a motion component separation process in the motion component separation part of the image processing apparatus according to the first embodiment.

FIG. 11 is an explanatory drawing of one example of the coordinate system used in the motion component separation process in the motion component separation part 110 of the image processing apparatus 100 according to the first embodiment. In order to set the center coordinates to the center of the frame image, the motion component separation part 110 performs transformation from the coordinate system, for example, illustrated in FIG. 9 to the coordinate system illustrated in FIG. 11. The matrices used for the above-mentioned transformation are the origin correction matrices indicated in Formula 5 and Formula 6. The matrix indicated in Formula 5 corresponds to a matrix for shifting the origin from the upper left to the center and the matrix indicated in Formula 6 corresponds to a matrix for returning the origin from the center to the upper left.

Figure 12:
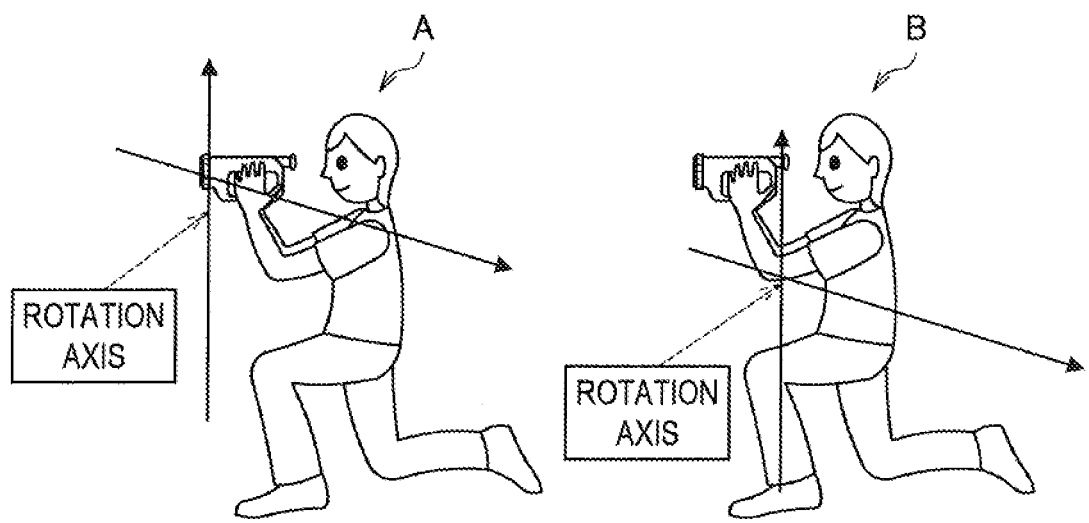
FIG. 12 is an explanatory drawing of a process for shifting an origin O (center coordinates) of a coordinate system to a center of a frame image.

Herein, the shifting of the origin O (center coordinates) of the coordinate system to the center of the frame image is supplemented. FIG. 12 is an explanatory drawing of a process for shifting the origin O (center coordinates) of the coordinate system to the center of the frame image.

When the image signal of the subject processed by the image processing apparatus 100 indicates a moving image captured by the user, for example, as illustrated in FIG. 12, it does not rotate around the center of the image as a rotation axis as illustrated in portion A of FIG. 12 actually, but rotates around an elbow or wrist of the user as the axis as illustrated in portion B of FIG. 12 in most cases. Therefore, the issue arises whether it is the best way or not to set the center coordinates to the center of the frame image, for example, as illustrated in FIG. 11.

Figure 13:
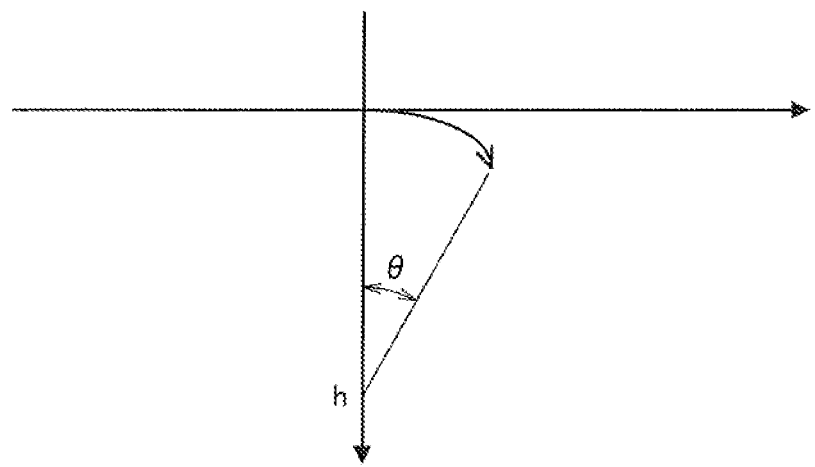
FIG. 13 is an explanatory drawing of a determinant in case of rotation around an elbow of a user.

However, even when the rotation around the elbow or the like as the axis is supposed, eventually it results in a combination of translation (vertical and horizontal) and rotation as indicated in Formula 7. Herein, Formula 7 indicates one example of a matrix representing camerawork in the case of the rotation around the elbow. Hence, in the case of simultaneously stabilizing the translation, the stabilizing around the center coordinates as the center of the frame image as illustrated in FIG. 11 enables to remove the blur component in the moving image to stabilize the moving image (to attain, so-called, an image stabilizing effect). FIG. 13 is an explanatory drawing of a determinant in the case of the rotation around the elbow of the user. Herein, a value "h" indicated in Formula 7 and FIG. 13 denotes a distance from the rotation axis to the elbow.

$$\begin{pmatrix} 1 & 0 & 0 \\ 0 & 1 & -h \\ 0 & 0 & 1 \end{pmatrix} \begin{pmatrix} \cos\theta & -\sin\theta & 0 \\ \sin\theta & \cos\theta & 0 \\ 0 & 0 & 1 \end{pmatrix} \begin{pmatrix} 1 & 0 & 0 \\ 0 & 1 & h \\ 0 & 0 & 1 \end{pmatrix} \quad \text{(Formula 7)}$$

Formula 7 can be transformed, for example, as in Formula 8 below. Accordingly, the motion in the case of the rotation around the elbow or the like can be represented as the combination of the rotation and the translation in view from the origin.

$$\begin{pmatrix} 1 & 0 & 0 \\ 0 & 1 & -h \\ 0 & 0 & 1 \end{pmatrix} \begin{pmatrix} \cos\theta & -\sin\theta & 0 \\ \sin\theta & \cos\theta & 0 \\ 0 & 0 & 1 \end{pmatrix} \begin{pmatrix} 1 & 0 & 0 \\ 0 & 1 & h \\ 0 & 0 & 1 \end{pmatrix} = \quad \text{(Formula 8)}$$

$$\begin{pmatrix} \cos\theta & -\sin\theta & -h\sin\theta \\ \sin\theta & \cos\theta & h\cos\theta \\ 0 & 0 & 1 \end{pmatrix} =$$

$$\begin{pmatrix} 1 & 0 & -h\sin\theta \\ 0 & 1 & h\cos\theta \\ 0 & 0 & 1 \end{pmatrix} \begin{pmatrix} \cos\theta & -\sin\theta & 0 \\ \sin\theta & \cos\theta & 0 \\ 0 & 0 & 1 \end{pmatrix}$$

(B) Aspect Ratio Transformation

The matrices indicated in Formula 9 and Formula 10 below, which are indicated in the component separation expression indicated in Formula 3 are aspect ratio transformation matrices. When a pixel aspect ratio is 1:p, where p denotes a fractional value, the matrix indicated in Formula 10 is a matrix for transforming the pixel aspect ratio to 1:1, and the matrix indicated in Formula 9 is a matrix for transforming the pixel aspect ratio to 1:p again after the transformation by Formula 10.

$$\begin{pmatrix} \frac{1}{p} & 0 & 0 \\ 0 & 1 & 0 \\ 0 & 0 & 1 \end{pmatrix} \quad \text{(Formula 9)}$$

$$\begin{pmatrix} p & 0 & 0 \\ 0 & 1 & 0 \\ 0 & 0 & 1 \end{pmatrix} \quad \text{(Formula 10)}$$

Figure 14:
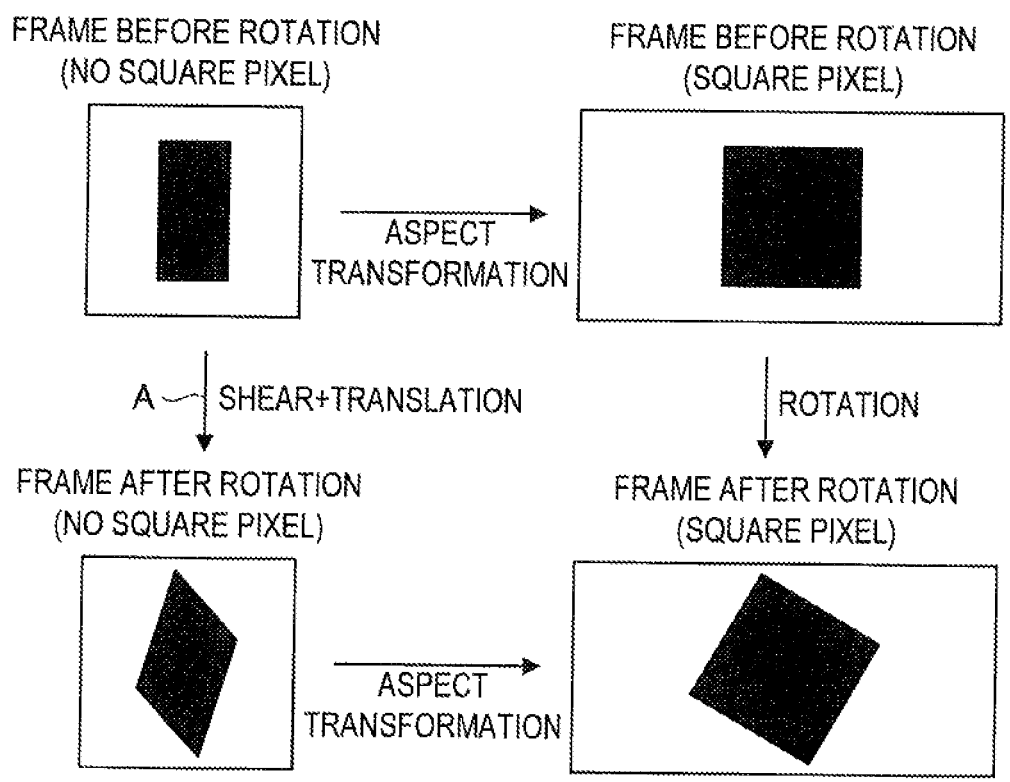
FIG. 14 is an explanatory drawing of one example of the motion component separation process in the image processing apparatus according to the first embodiment.

FIG. 14 is an explanatory drawing of one example of the motion component separation process in the image processing apparatus 100 according to the first embodiment. Usually in the moving image, there are no square pixels with the pixel aspect ratio of 1:1. Since the scaling is different in the X-axis and Y-axis, even when the camera rotates as to the actual image, for example, as illustrated in portion A of FIG. 14, the image after the rotation is different from the one obtained by the transformation using the rotation matrix. Namely, as to the image without square pixels, the rotation correction is difficult to be modeled using the rotation matrix.

Therefore, the motion component separation part 110 performs transformation once into the square pixels, for example, as indicated in Formula 11 below, and after that, applies the rotation matrix sequentially to perform the transformation to the pixel aspect ratio of 1:p, using the aspect ratio transformation matrices.

$$\begin{pmatrix} \frac{1}{p} & 0 & 0 \\ 0 & 1 & 0 \\ 0 & 0 & 1 \end{pmatrix} \begin{pmatrix} \cos\theta & -\sin\theta & 0 \\ \sin\theta & \cos\theta & 0 \\ 0 & 0 & 1 \end{pmatrix} \begin{pmatrix} p & 0 & 0 \\ 0 & 1 & 0 \\ 0 & 0 & 1 \end{pmatrix} \quad \text{(Formula 11)}$$

(C) Focal Plane Distortion Component

The matrices indicated in Formula 12 below, which are indicated in the component separation expression indicated in Formula 3, denotes focal plane distortion components. Herein, the matrix including "e" indicated in Formula 12 is a matrix representing scaling in the vertical direction and the matrix including "b" indicated in Formula 12 is a matrix representing parallelogram distortion.

$$\begin{pmatrix} 1 & 0 & 0 \\ 0 & e & 0 \\ 0 & 0 & 1 \end{pmatrix} \begin{pmatrix} 1 & b & 0 \\ 0 & 1 & 0 \\ 0 & 0 & 1 \end{pmatrix} \quad \text{(Formula 12)}$$

Figure 15:
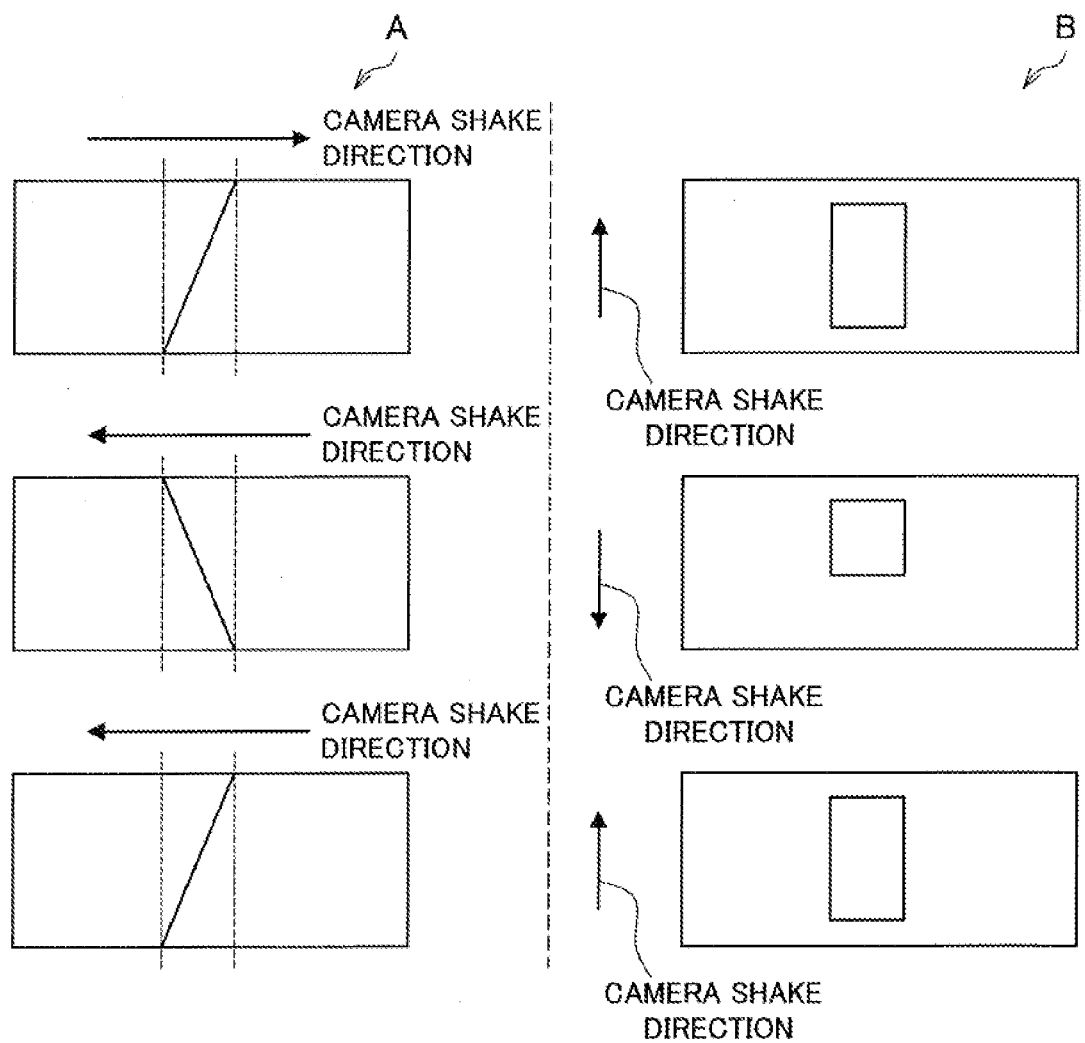
FIG. 15 is an explanatory drawing of one example of focal plane distortion.

FIG. 15 is an explanatory drawing of one example of the focal plane distortions. Portion A illustrated in FIG. 15 indicates one example of transition of distortion of a straight line. Portion B illustrated in FIG. 15 indicates one example of transition of distortion of a rectangle. As illustrated in FIG. 15, the focal plane distortion varies in manners of occurrence depending on motion directions, for example, caused by camera shake or the like during the image capturing by the user. Therefore, the motion component separation part 110 employs the matrices of combination of two matrices as indicated in Formula 12 as the matrices representing the focal plane distortion components.

(D) Rotation/Translation Component

The matrices indicated in Formula 13 below, which are indicated in the component separation expression indicated in Formula 3, denotes a rotation/translation component. In Formula 13, "$\theta$" denotes a rotation angle, "h" denotes a movement amount in the horizontal direction and "v" denotes a movement amount in the vertical direction.

$$\begin{pmatrix} 1 & 0 & h \\ 0 & 1 & v \\ 0 & 0 & 1 \end{pmatrix} \begin{pmatrix} \cos\theta & -\sin\theta & 0 \\ \sin\theta & \cos\theta & 0 \\ 0 & 0 & 1 \end{pmatrix} \quad \text{(Formula 13)}$$

(E) Scaling Component

The matrix indicated in Formula 14 below, which is indicated in the component separation expression indicated in Formula 3, denotes a scaling component. Herein, Formula 14 indicates variation in expansion or contraction of the image, for example, due to zooming and/or variation of a image capturing position during the capturing the moving image.

$$\begin{pmatrix} s & 0 & 0 \\ 0 & s & 0 \\ 0 & 0 & 1 \end{pmatrix} \quad \text{(Formula 14)}$$

The component separation expression indicated in Formula 3 has the matrices indicated in items (A) to (E) above. Next, the process in the motion component separation part 110 (one example of solution of separation parameters) is described.

The motion component separation part 110 transforms the component separation expression indicated in Formula 3, for example, as indicated in Formula 15 below.

$$\begin{pmatrix} x' \\ y' \\ 1 \end{pmatrix} = \begin{pmatrix} \frac{1}{p} & 0 & 0 \\ 0 & 1 & 0 \\ 0 & 0 & 1 \end{pmatrix}^{-1} \begin{pmatrix} 1 & 0 & h_c \\ 0 & 1 & v_c \\ 0 & 0 & 1 \end{pmatrix}^{-1} \quad \text{(Formula 15)}$$

-continued $$\begin{pmatrix} A_1 & A_2 & A_0 \\ B_1 & B_2 & B_0 \\ 0 & 0 & 1 \end{pmatrix} \begin{pmatrix} 1 & 0 & -h_c \\ 0 & 1 & -v_c \\ 0 & 0 & 1 \end{pmatrix}^{-1} \begin{pmatrix} p & 0 & 0 \\ 0 & 1 & 0 \\ 0 & 0 & 1 \end{pmatrix}^{-1} \begin{pmatrix} x \\ y \\ 1 \end{pmatrix} =$$

$$\begin{pmatrix} a_1 & a_2 & a_0 \\ b_1 & b_2 & b_0 \\ 0 & 0 & 1 \end{pmatrix} \begin{pmatrix} x \\ y \\ 1 \end{pmatrix} = \begin{pmatrix} 1 & 0 & 0 \\ 0 & e & 0 \\ 0 & 0 & 1 \end{pmatrix} \begin{pmatrix} 1 & b & 0 \\ 0 & 1 & 0 \\ 0 & 0 & 1 \end{pmatrix}$$

$$\begin{pmatrix} \cos\theta & -\sin\theta & 0 \\ \sin\theta & \cos\theta & 0 \\ 0 & 0 & 1 \end{pmatrix} \begin{pmatrix} 1 & 0 & h \\ 0 & 1 & v \\ 0 & 0 & 1 \end{pmatrix} \begin{pmatrix} s & 0 & 0 \\ 0 & s & 0 \\ 0 & 0 & 1 \end{pmatrix} \begin{pmatrix} x \\ y \\ 1 \end{pmatrix}$$

Then, the motion component separation part 110 calculates "sin $\theta$", "b", "e", "s", "h" and "v" from Formula 15. In addition, a value "p" indicated in Formula 15 denotes the aspect ratio and values "$h_c$" and "$v_c$" indicated in Formula 15 denote the center coordinates. Therefore, the motion component separation part 110 can set the values "p", "$h_c$" and "$v_c$" to known values.

Formula 16 to Formula 19 below indicate the resulting solution of Formula 15. Herein, Formula 16 indicates the solution in the case of $\theta=0$ ($b_1=0$), Formula 17 the solution in the case of $\theta=\pi/2$ ($b_2=0$, $b_1>0$) and Formula 18 the solution in the case of $\theta=-\pi/2$ ($b_2=0$, $b_1<0$), respectively. Moreover, Formula 19 indicates the solution in the case of $-\pi/2<\theta<\pi/2$. Herein, "sin $\theta$" and "cos $\theta$" indicated in Formula 19 are represented by Formula 20 and Formula 21 below, where "tan $\theta=b_1/(b_2 \cdot p)$" as to tan $\theta$. Herein, Formula 20 indicates "sin $\theta$" and "cos $\theta$" in the case of "$b_1>0$, tan $\theta>0$, or $b_1<0$, tan $\theta<0$". Moreover, Formula 21 indicates "sin $\theta$" and "cos $\theta$" in the case of "$b_1<0$, tan $\theta>0$, or $b_1>0$, tan $\theta<0$".

$$\begin{aligned} s &= -a_2 \\ b &= \frac{a_1}{s} = -\frac{a_1}{a_2} \\ e &= \frac{b_1}{sp} = -\frac{b_1}{a_2} \\ v &= \frac{b_0}{e} = -\frac{a_2 b_0}{b_1} \\ h &= a_0 - bv = a_0 - \frac{a_1}{b_1} \end{aligned} \quad \text{(Formula 16)}$$

$$\begin{aligned} s &= -a_2 \\ b &= \frac{a_1}{s} = -\frac{a_1}{a_2} \\ e &= \frac{b_1}{sp} = -\frac{b_1}{a_2} \\ v &= \frac{b_0}{e} = -\frac{a_2 b_0}{b_1} \\ h &= a_0 - bv = a_0 - \frac{a_1}{b_1} \end{aligned} \quad \text{(Formula 17)}$$

$$\begin{aligned} s &= a_2 \\ b &= -\frac{a_1}{s} = -\frac{a_1}{a_2} \\ e &= -\frac{b_1}{sp} = -\frac{b_1}{a_2} \\ v &= \frac{b_0}{e} = -\frac{a_2 b_0}{b_1} \\ h &= a_0 - bv = a_0 - \frac{a_1}{b_1} \end{aligned} \quad \text{(Formula 18)}$$

-continued $$b = \frac{a_1 \sin\theta + a_2 \cos\theta}{a_1 \cos\theta - a_2 \sin\theta}$$ (Formula 19)

$$s = \frac{a_1}{\cos\theta + b\sin\theta}$$

$$e = \frac{b_1}{\sin\theta}$$

$$v = \frac{b_0}{e}$$

$$h = a_0 - bv$$

$$\sin\theta = \frac{\tan\theta}{\sqrt{1 + \tan^2\theta}},$$ (Formula 20)

$$\cos\theta = \frac{1}{\sqrt{1 + \tan^2\theta}}$$

$$\sin\theta = \frac{-\tan\theta}{\sqrt{1 + \tan^2\theta}},$$ (Formula 21)

$$\cos\theta = \frac{1}{\sqrt{1 + \tan^2\theta}}$$

The motion component separation part 110 factorizes the motion vector transmitted from the motion detection part 108 into the individual transformation matrices by calculating "sin θ", "b", "e", "s", "h", "v" and "θ", for example, as indicated in Formula 16 to Formula 19. Then, the motion component separation part 110 transmits the factorized components (for example, data indicating the distortion components and date indicating the motion components) to the buffer 112.

[Buffer 112]

The buffer 112 accumulates the components transmitted from the motion component separation part 110. Herein, the buffer 112 plays the role of a queue, for example, in a FIFO (First-In First-Out) manner similar to the buffer 106. Herein, the buffer 112 accumulates the components transmitted from the motion component separation part 110, for example, at least for the components used for processes in the decision unit 104.

The distortion component calculation unit 102 includes, for example, the buffer 106, the motion detection part 108, the motion component separation part 110 and the buffer 112 as mentioned above, and can calculate the distortion components based on the inputted image signal. In addition, the configuration of the distortion component calculation unit 102 is, of course, not limited to the configuration illustrated in FIG. 6.

Next, the decision unit 104 is described. Hereinafter, an example is described in which the second region is the upper half region of the frame image obtained by bisection in the horizontal direction (upper half frame) and the third region is the lower half region of the frame image obtained by the bisection in the horizontal direction (lower half frame).

The decision unit 104 initiatively plays the role of performing the processes indicated in item (II) above (decision processes) and decides the scanning pattern of the imaging device having captured the moving image which the image signal indicates based on the results of correlation based on the distortion components calculated in the distortion component calculation unit 102.

Figure 16:
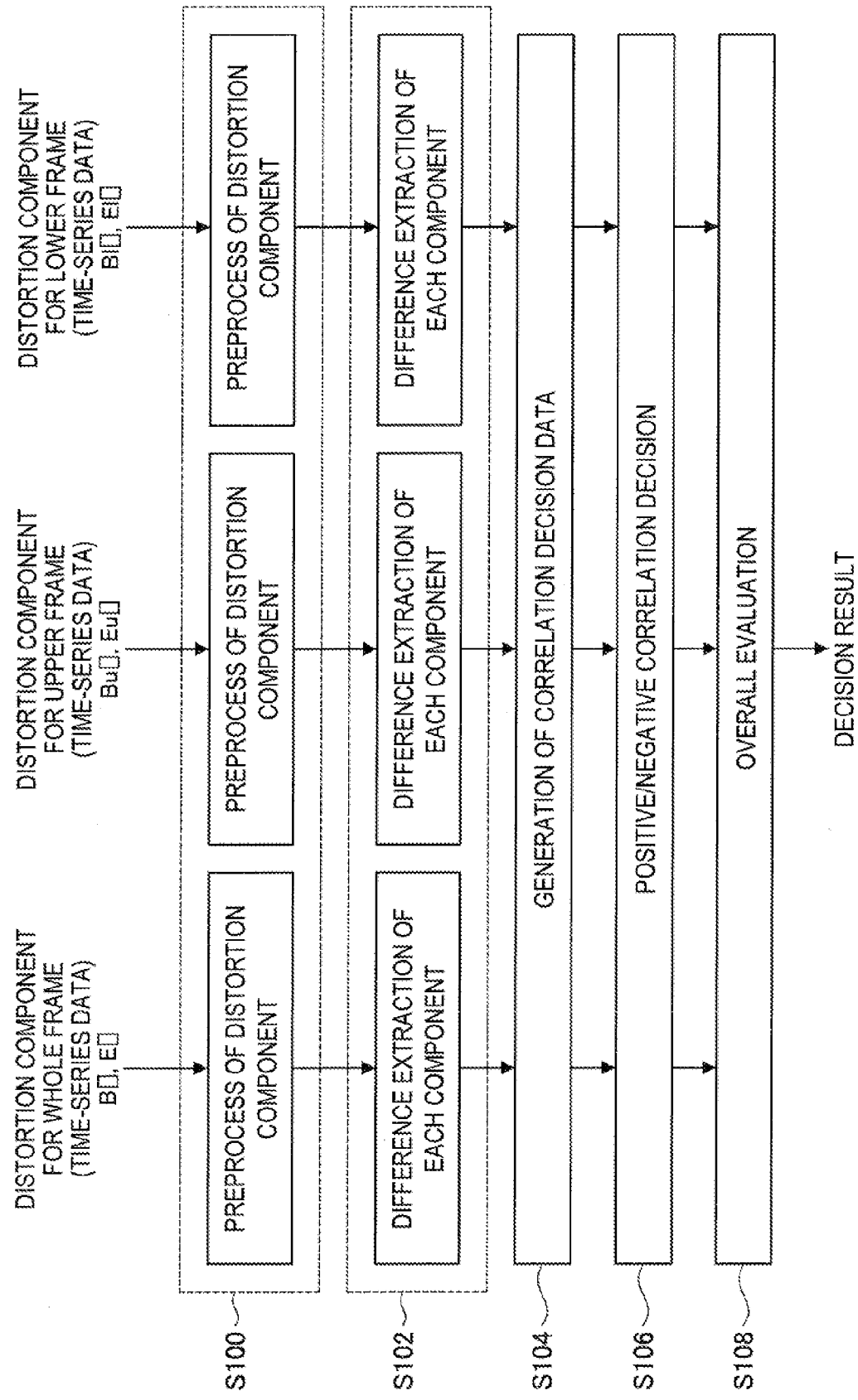
FIG. 16 is an explanatory drawing of one example of processes in a decision unit of the image processing apparatus according to the first embodiment.

FIG. 16 is an explanatory drawing of one example of processes in the decision unit 104 of the image processing apparatus 100 according to the first embodiment. The decision unit 104 processes time-series data of the distortion components corresponding to each of the first region (the whole frame), the second region (for example, the upper half frame) and the third region (for example, the lower half frame).

(i) Preprocess of Each Distortion Component (S100)

The decision unit 104 configures the distortion components in which the reliability degree of GMV (reliability degree corresponding to one frame) is equal to or smaller than a predetermined threshold value to distortion component reference values. Herein, the distortion component reference values can be, for example, "0" for B and "1" for E.

(ii) Difference Extraction Process of Each Distortion Component (S102)

The decision unit 104 subtracts the distortion component reference values from individual constituents of the distortion component time-series data of each of the first region, second region and third region to generate new distortion component time-series data. Hereinafter, the new distortion component time-series data corresponding to the first region are indicated by "B'[ ]" and "E'[ ]". Moreover, the new distortion component time-series data corresponding to the second region are indicated by "Bu'[ ]" and "Eu'[ ]" and the new distortion component time-series data corresponding to the third region are indicated by "Bl'[ ]" and "El'[ ]".

(iii) Generation Process of Correlation Data of Each Distortion Component (S104)

For example, configuring Bu'[ ], which is the distortion component in the horizontal direction, as the reference, the decision unit 104 generates positive correlation decision data and negative correlation decision data as indicated in Formula 22 and Formula 23 below.

Herein, Formula 22 and Formula 23 exemplarily indicate the generation of the correlation decision data by the decision unit 104, configuring Bu'[ ], which is the distortion component in the horizontal direction, as the reference, whereas the processes in the decision unit 104 according to the first embodiment are not limited to the above. For example, the decision unit 104 may generate the correlation decision data, configuring Eu'[ ], which is the distortion component in the vertical direction, as the reference. Moreover, the decision unit 104 can generate both of the correlation decision data, configuring Bu'[ ], which is the distortion component in the horizontal direction, as the reference, and the correlation decision data, configuring Eu'[ ], which is the distortion component in the vertical direction, as the reference. In addition, the detection accuracy of the distortion value is generally higher in the case of using the distortion component in the horizontal direction than in the case of using the distortion component in the vertical direction. Therefore, the generation of the correlation decision data by the decision unit 104, configuring Bu'[ ], which is the distortion component in the horizontal direction, as the reference, is hereinafter exemplarily described below.

positive correlation decision data=$(Bu'[\ ]-Bl'[\ ],Bu'[\ ]-B'[\ ])$ (Formula 22)

negative correlation decision data=$(Bu'[\ ]+Bl'[\ ],Bu'[\ ]+B'[\ ])$ (Formula 23)

(iv) Positive/Negative Correlation Decision Processes (S106)

The decision unit 104 decides each of the correlation result between the second region (upper half frame) and the third region (lower half frame) and the correlation result between the second region (upper half frame) and the first region (whole frame).

Figure 17:
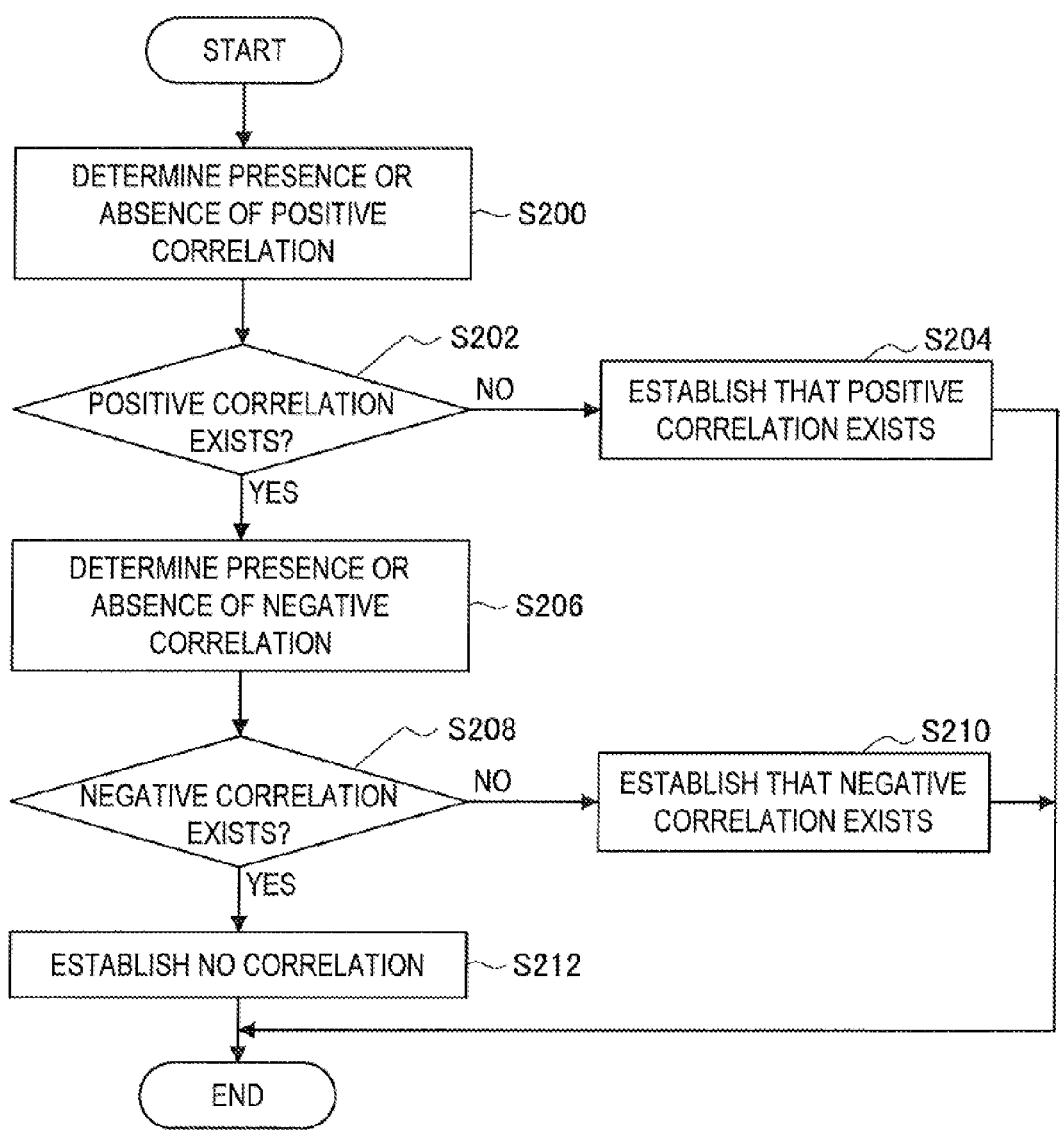
FIG. 17 is a flowchart for explaining one example of positive/negative correlation decision processes in the decision unit of the image processing apparatus according to the first embodiment.

FIG. 17 is a flowchart for explaining one example of the positive/negative correlation decision processes in the decision unit 104 of the image processing apparatus 100 according to the first embodiment.

The decision unit 104 determines the presence or absence of positive correlation based on the positive correlation decision data generated in the process of item (iii) above (generation process of the correlation data of each distortion component) (S200).

Figures 18, 19:
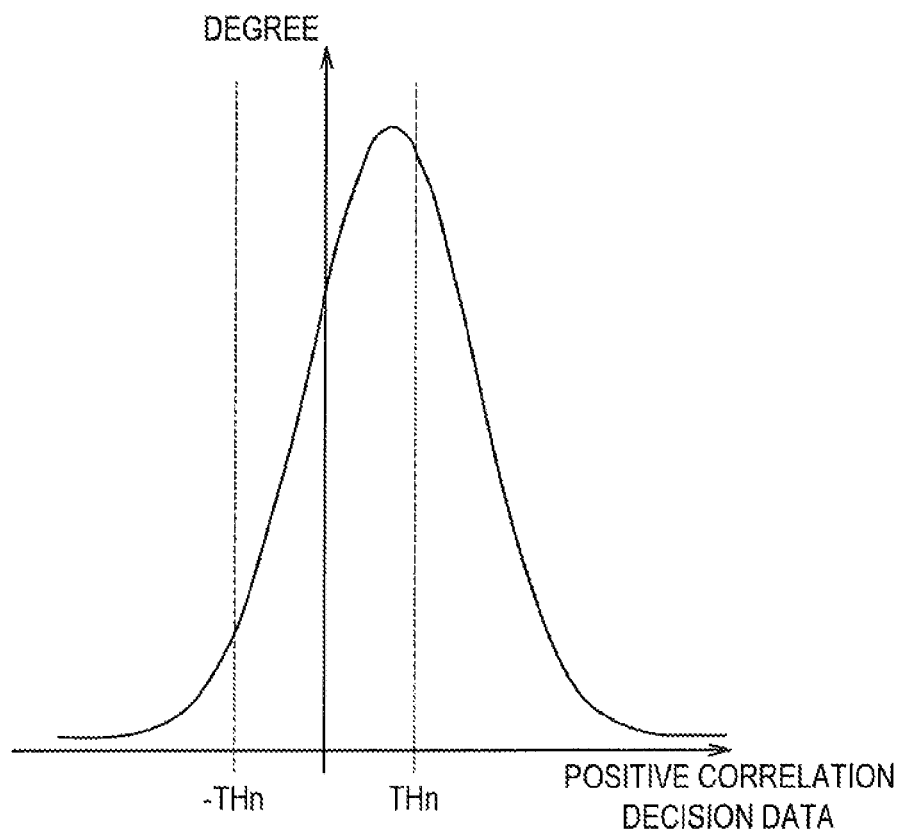
FIG. 18 is an explanatory drawing of one example of a determination method of presence or absence of positive correlation in the decision unit of the image processing apparatus according to the first embodiment.
FIG. 19 is an explanatory drawing of an over-all evaluation process in the decision unit of the image processing apparatus according to the first embodiment.

FIG. 18 is an explanatory drawing of one example of a determination method of the presence or absence of the positive correlation in the decision unit 104 of the image processing apparatus 100 according to the first embodiment. Herein, FIG. 18 indicates a histogram of the positive correlation decision data.

The decision unit 104 calculates, for example, based on the histogram of the generated positive correlation decision data as illustrated in FIG. 18, based on a predetermined threshold value "−THn" and threshold value "THn", a ratio (0 to 1.0) of a sum of the degrees from "−THn" to "THn" relative to a total sum of the degrees in the histogram illustrated in FIG. 18. Then, the decision unit 104 determines that there is the positive correlation when the calculated ratio is equal to or greater than a predetermined threshold value "THr" (0≤THr≤1.0) (or when it is larger than the threshold value "THr"). Moreover, the decision unit 104 determines that there is no positive correlation when the calculated ratio is smaller than the predetermined threshold value "THr" (or when it is equal to or smaller than the threshold value "THr"). In addition, the determination method of the positive correlation in the decision unit 104 according to the first embodiment is, of course, not limited to the above.

Again referring to FIG. 17, the one example of the positive/negative correlation decision processes in the decision unit 104 is described. After the determination of the presence or absence of the positive correlation in step S200, the decision unit 104 decides whether or not there is the positive correlation (S202).

When it is decided that there is the positive correlation in step S202, the decision unit 104 establishes that there is the positive correlation (S204) and terminates the positive/negative correlation decision processes.

Moreover, when it is not decided that there is positive correlation in step S202, the decision unit 104 determines, based on the negative correlation decision data generated in the process of item (iii) above (generation process of the correlation data of each distortion component), the presence or absence of negative correlation (S206). Herein, the decision unit 104 determines the presence or absence of the negative correlation by, for example, performing the process similar to the process in step S200.

After the determination of the presence or absence of the negative correlation in step S206, the decision unit 104 decides whether or not there is the negative correlation (S208).

When it is decided that there is the negative correlation in step S208, the decision unit 104 establishes that there is the negative correlation (S210) and terminates the positive/negative correlation decision processes. Moreover, when it is not decided that there is the negative correlation in step S208, the decision unit 104 establishes that there is no correlation (S212) and terminates the positive/negative correlation decision processes.

The decision unit 104 decides each of the correlation result between the second region (upper half frame) and the third region (lower half frame) and the correlation result between the second region (upper half frame) and the first region (whole frame) by, for example, performing the processes illustrated in FIG. 17. In addition, the positive/negative correlation decision processes in the decision unit 104 of the image processing apparatus 100 according to the first embodiment are, of course, not limited to the processes illustrated in FIG. 17.

Again referring to FIG. 16, the one example of the processes in the decision unit 104 is described.

(v) Over-all Evaluation Process (S108)

The decision unit 104 decides the scanning pattern of the imaging device having captured the moving image based on the result of the processes of item (iv) above (positive/negative correlation decision processes). More specifically, the decision unit 104 decides the scanning pattern of the imaging device by, for example, comparing data indicating the results of correlation of distortion for individual scanning patterns of the known imaging devices with a combination of the results of correlation based on the calculated distortion components.

Figure 4:
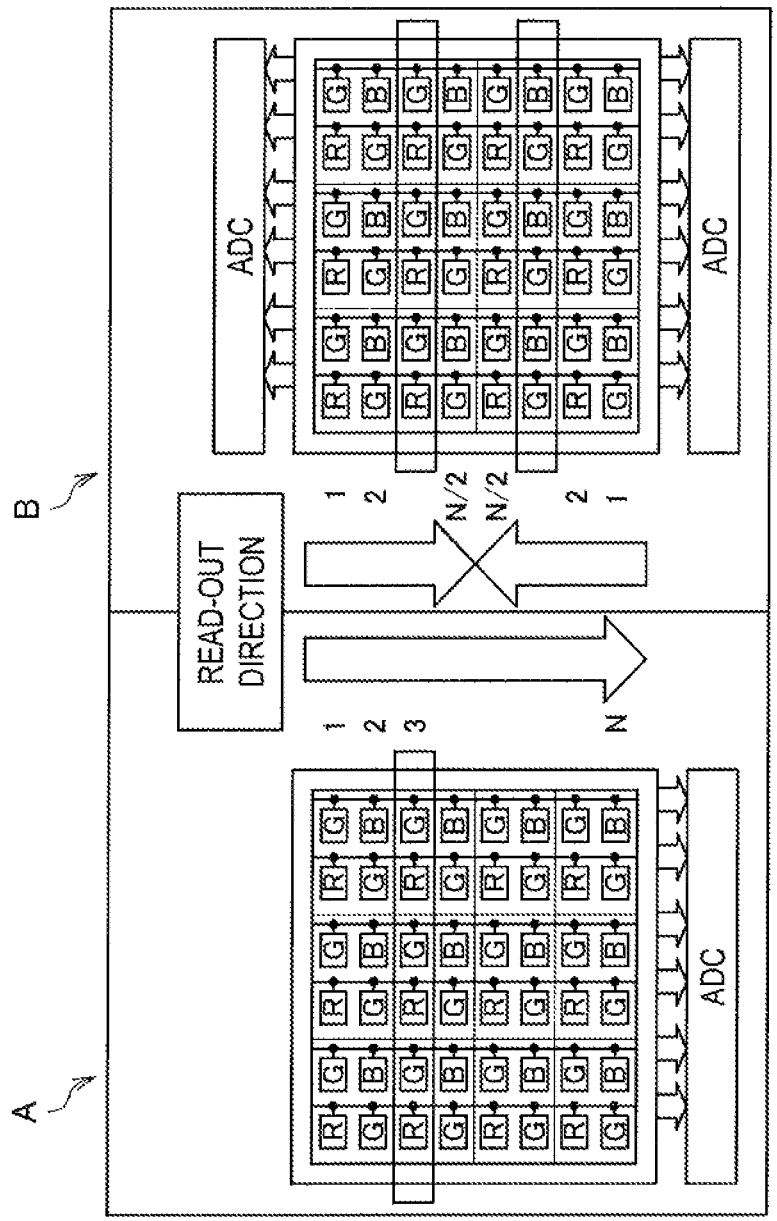

FIG. 19 is an explanatory drawing of the over-all evaluation process in the decision unit 104 of the image processing apparatus 100 according to the first embodiment. Herein, FIG. 19 indicates a table as one example of the data indicating the results of correlation of distortion for individual scanning patterns of the known imaging devices. The symbol "+" illustrated in FIG. 19, the symbol "−" illustrated in FIG. 19 and the symbol "N" illustrated in FIG. 19 indicate the case of the positive correlation, the case of the negative correlation and the case of no correlation, respectively. Moreover, the symbol "P" illustrated in FIG. 19 indicates the past scanning pattern, for example, illustrated in portion A of FIG. 4, and the symbols "1" and "2" illustrated in FIG. 19 indicate certain scanning patterns, respectively. Moreover, the symbol "U" illustrated in FIG. 19 indicates an unknown scanning pattern. In addition, in the case of employing the table illustrated in FIG. 19, the unknown scanning pattern implies, for example, a possibility of another certain scanning pattern. Herein, the implied other scanning pattern can be, for example, a scanning pattern defined by a creating person who creates the table illustrated in FIG. 19 based on its experience.

The decision unit 104 decides the scanning pattern of the imaging device by, for example, fitting the results of the processes of item (iv) above (positive/negative correlation decision processes) to the table illustrated in FIG. 19.

In addition, the over-all evaluation process in the decision unit 104 of the image processing apparatus 100 according to the first embodiment is not limited to the above. For example, when the decision result that the scanning pattern is unknown is obtained as a result of the decision using the table illustrated in FIG. 19, the decision unit 104 may specify the scanning pattern by further performing a process. Herein, as such a process, the decision unit 104 may further perform, for example, "repeating the processes using E as well as B again," "deciding using history information indicating history of previous decisions," "deciding using information of the image capturing apparatus contained in the image signal or information of the image capturing apparatuses acquired from an external instrument as a server," or the like.

Moreover, the decision unit 104 can perform, based on a user operation onto a selection screen causing the user to select decision accuracy, the decision in response to the selected decision accuracy.

Figures 20A, 20B:
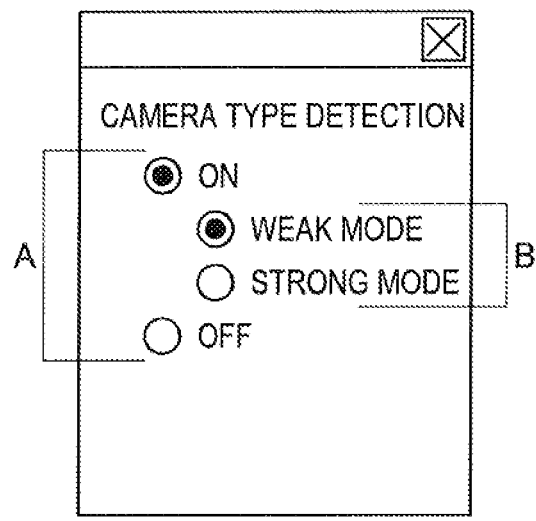
FIG. 20A is an explanatory drawing of one example of processes in the decision unit of the image processing apparatus according to the first embodiment.
FIG. 20B is an explanatory drawing of one example of processes in the decision unit of the image processing apparatus according to the first embodiment.
Figure 21:
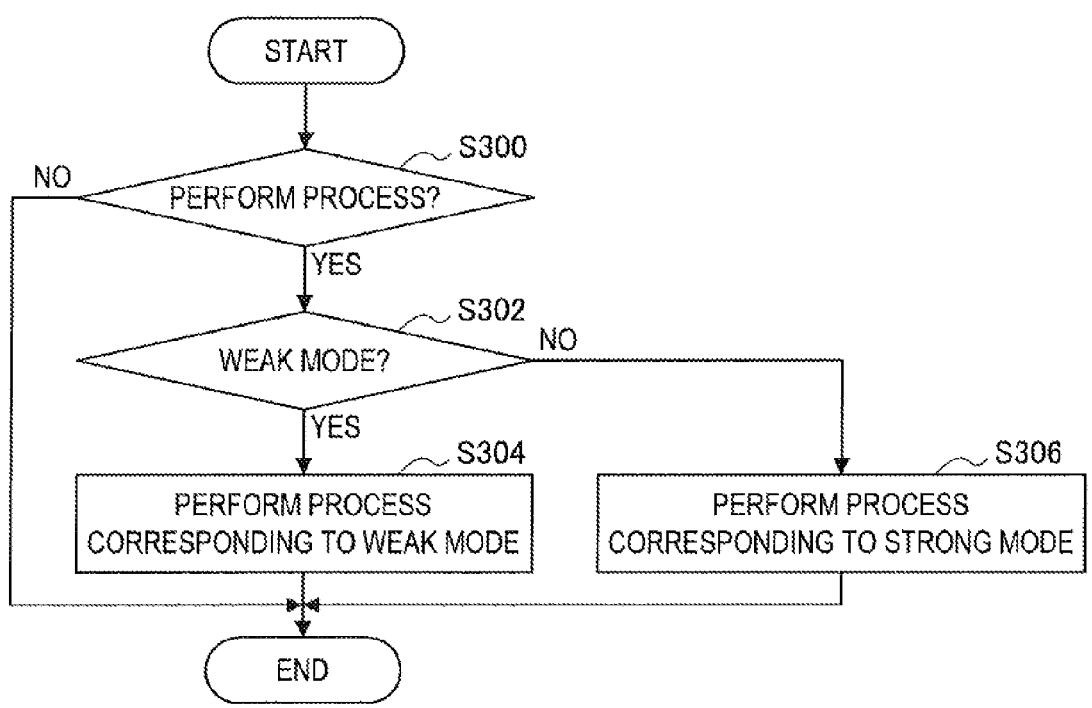
FIG. 21 is an explanatory drawing of one example of processes in the decision unit of the image processing apparatus according to the first embodiment.

FIG. 20A, FIG. 20B and FIG. 21 are explanatory drawings of one example of processes in the decision unit 104 of the image processing apparatus 100 according to the first embodiment. Herein, FIG. 20A illustrates one example of a timeline view of authoring software of the moving image. FIG. 20B illustrates one example of the selection screen causing the user to select the decision accuracy. Moreover, FIG. 21 illustrates one example of the processes in the decision unit 104 performed in response to the selection on the selection screen illustrated in FIG. 20B.

For example, when the user configures a track and a decision section in the timeline view illustrated in FIG. 20A, the selection screen illustrated in FIG. 20B is displayed. Herein, the screens illustrated in FIG. 20A and FIG. 20B may be displayed on the display unit (not shown) included in the image processing apparatus 100 or displayed on an external display.

The decision unit 104 performs the processes in response to the settings, for example, illustrated in portions A and B of FIG. 20B. Hereinafter, referring to FIG. 21, one example of the processes in the decision unit 104 in response to the settings illustrated in portions A and B of FIG. 20B is described.

The decision unit 104 decides whether performing the processes or not (S300). Herein, the decision unit 104 performs the decision in response to the setting, for example, illustrated in portion A of FIG. 20B. When the setting, for example, illustrated in portion A of FIG. 20B is "ON" the decision unit 104 decides the performing of the processes. When the setting, for example, illustrated in portion A of FIG. 20B is "OFF" the decision unit 104 decides no performing of the processes.

When no performing of the processes is decided in step S300 the decision unit 104 does not perform the processes, for example, illustrated in FIG. 16. In the above-mentioned case, the image processing apparatus 100 is not to perform the decision of the scanning pattern of the imaging device based on the image signal.

Moreover, when the performing of the processes is decided in step S300 the decision unit 104 decides the weak mode or not (S302). When the setting, for example, illustrated in portion B of FIG. 20B is the "weak mode" the decision unit 104 decides the weak mode. When the setting, for example, illustrated in portion B of FIG. 20B is the "strong mode" the decision unit 104 does not decide the weak mode.

When the weak mode is decided in step S302 the decision unit 104 performs the process corresponding to the weak mode (S304). Herein, the process in the decision unit 104 corresponding to the weak mode can include, for example, performing the processes illustrated in FIG. 16 only using B, performing the processes illustrated in FIG. 16 without using the index of possibility implication illustrated in the table of FIG. 19, or the like.

Moreover, when the weak mode is not decided in step S302 the decision unit 104 performs the process corresponding to the strong mode (S306). Herein, the process in the decision unit 104 corresponding to the strong mode can include, for example, performing the processes illustrated in FIG. 16 using B and E, performing the processes illustrated in FIG. 16 using the index of possibility implication illustrated in the table of FIG. 19, or the like.

The decision unit 104 can perform, for example, based on a user operation onto a selection screen causing the user to select decision accuracy as illustrated in FIG. 21, the decision in response to the selected decision accuracy.

The image processing apparatus 100 according to the first embodiment performs the processes of item (I) above (distortion component calculation processes) and the processes of item (II) above (decision processes) according to the image processing method according to the present embodiments by, for example, including the distortion component calculation unit 102 and the decision unit 104 as illustrated in FIG. 6. Therefore, the image processing apparatus 100 can decide the scanning pattern of the imaging device having captured the moving image which the image signal indicates based on the image signal. In addition, the configuration of the image processing apparatus 100 according to the first embodiment is, of course, not limited to the configuration illustrated in FIG. 6.

Image Processing Apparatus According to Second Embodiment

The image processing apparatus according to the present embodiments is not limited to the above-mentioned image processing apparatus 100 according to the first embodiment. For example, the distortion component calculation unit 102 of the image processing apparatus 100 according to the first embodiment processes the whole frame image as the first region, whereas the distortion component calculation unit according to the present embodiments can also process a region from which a partial region of the frame image is excluded as the first region.

Figure 22:
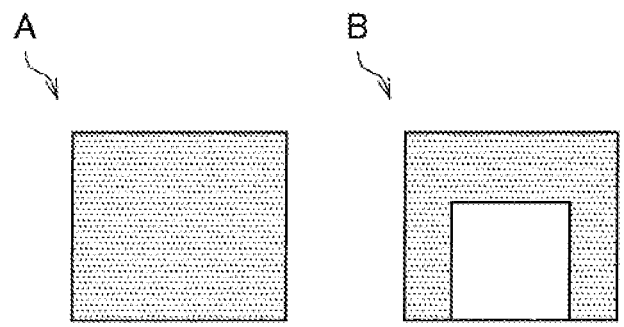
FIG. 22 is an explanatory drawing of one example of a first region configured by an image processing apparatus according to a second embodiment.

FIG. 22 is an explanatory drawing of one example of the first region configured by an image processing apparatus according to a second embodiment. Herein, portion A of FIG. 22 illustrates the case of the whole frame image as the first region and portion B of FIG. 22 illustrates the case of the region from which a partial region of the frame image is excluded as the first region.

The image processing apparatus according to the second embodiment (more specifically, the distortion component calculation unit) processes the region from which the partial region of the frame image is excluded, for example, as illustrated in portion B of FIG. 22 as the first region. Herein, a region excluded from the frame image can be, for example, a region in which the reliability degree is low in the case of the decision of the scanning pattern (for example, a region in which a possibility of the presence of an object is high).

The image processing apparatus according to the second embodiment may configure and process the first region from which a part is excluded, for example, as illustrated in portion B of FIG. 22. Thereby, it can reduce the influence of noise caused by subject blur or the like, although there is a possibility of a decreasing detection accuracy of GMV detected from the first region due to decrease of a used region.

Image Processing Apparatus According to Third Embodiment

The image processing apparatus according to the present embodiments is not limited to the above-mentioned image processing apparatus 100 according to the first embodiment or image processing apparatus according to the second embodiment. For example, the image processing apparatus according to the first embodiment and the second embodiment exemplarily processes the individual inputted frame image similarly, whereas the image processing apparatus according to the present embodiments may perform processes based on whether each inputted frame image is the frame image at an odd frame or the frame image at an even frame.

More specifically, an image processing apparatus according to a third embodiment (more specifically, the distortion component calculation unit) may calculate the distortion components based on, for example, either the frame image at the odd frame or the frame image at the even frame. In the above case, the decision unit is to decide the scanning pattern of the imaging device based on the distortion components based on either the frame image at the odd frame or the frame image at the even frame.

Moreover, the image processing apparatus according to the third embodiment (more specifically, the distortion component calculation unit) may calculate the distortion components by, for example, inverting either the frame image at the odd frame or the frame image at the even frame. In the above case, the decision unit is to decide the scanning pattern of the imaging device based on the distortion components obtained by inverting either the frame image at the odd frame or the frame image at the even frame.

The image processing apparatus according to the third embodiment performs processes based on, for example, whether each inputted frame image is the frame image at the odd frame or the frame image at the even frame as above, and thereby, enables to handle the imaging device employing the rolling shutter method. In addition, the image processing apparatus according to the third embodiment may selectively perform the processes according to the third embodiment based on, for example, information which the information of the image capturing apparatus included in the image signal indicates and which indicates whether or not the rolling shutter method is employed.

Image Processing Apparatus According to Fourth Embodiment

The image processing apparatus according to the present embodiments is not limited to the above-mentioned image processing apparatus according to the first embodiment to image processing apparatus according to the third embodiment. For example, the above-mentioned image processing apparatus according to the first embodiment to image processing apparatus according to the third embodiment exemplarily perform the processes by configuring two partitioned regions as the second region and third region, whereas the image processing apparatus according to the present embodiments can also perform the processes by configuring 4 partitioned regions, 8 partitioned regions or the like by recursively performing the processes according to the image processing method according to the present embodiments.

Figure 23:
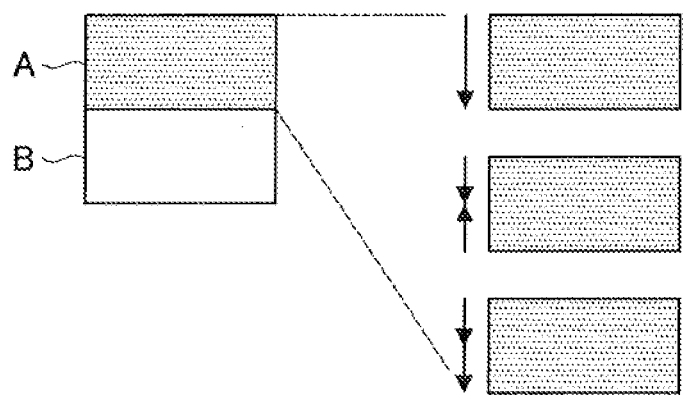
FIG. 23 is an explanatory drawing of one example of processes in an image processing apparatus according to a fourth embodiment.

FIG. 23 is an explanatory drawing of one example of processes in an image processing apparatus according to a fourth embodiment. For example, when there are a partitioned region illustrated in portion A of FIG. 23 and a partitioned region illustrated in portion B of FIG. 23 as illustrated in FIG. 23, the image processing apparatus according to the fourth embodiment performs the processes similar to the processes in the image processing apparatus 100 according to the first embodiment on each partitioned region.

More specifically, for example, exemplarily as to the region illustrated in portion A of FIG. 23, the image processing apparatus according to the fourth embodiment (more specifically, the distortion component calculation unit) calculates the distortion components for each of a fourth region corresponding to the whole partitioned region illustrated in portion A of FIG. 23, a fifth region corresponding to one region obtained by dividing the partitioned region illustrated in portion A of FIG. 23 and a sixth region corresponding to the other region obtained by dividing the partitioned region illustrated in portion A of FIG. 23. Herein, the above-mentioned fourth region corresponds to the first region according to the first embodiment. Moreover, the above-mentioned fifth region corresponds to, for example, the second region according to the first embodiment, and the above-mentioned sixth region corresponds to, for example, the third region according to the first embodiment. In other words, the processes on the region illustrated in portion A of FIG. 23 in the distortion component calculation unit according to the fourth embodiment are similar to the processes on the frame image in the distortion component calculation unit 102 according to the first embodiment.

Moreover, the image processing apparatus according to the fourth embodiment (more specifically, the decision unit) decides the scanning pattern of the imaging device having captured the moving image based on the decision result of the scanning pattern which is decided based on the correlation of distortion between the fifth region and the fourth region and the correlation of distortion between the fifth region and the sixth region. Therefore, the decision unit according to the sixth embodiment can decide the scanning pattern of the imaging device when configuring the region illustrated in portion A of FIG. 23 as an object as illustrated in FIG. 23.

The image processing apparatus according to the fourth embodiment performs the processes exemplarily as to the region illustrated in portion A of FIG. 23 above on, for example, the region illustrated in portion B of FIG. 23, individual regions obtained by dividing the respective regions illustrated in portions A and B of FIG. 23, and the like. Then, the image processing apparatus according to the fourth embodiment (more specifically, the decision unit) decides the scanning pattern of the imaging device corresponding to the whole moving image by, for example, counting the decision results of the scanning pattern of the imaging device for the respective partitioned regions. Herein, a decision method of the scanning pattern of the imaging device based on the decision results of the scanning pattern of the imaging device for the respective partitioned regions can include, for example, deciding the scanning pattern of the imaging device which appears most frequently among the decision results of the scanning pattern of the imaging device for the respective partitioned regions as the scanning pattern of the imaging device corresponding to the whole moving image.

In addition, the image processing apparatus according to the fourth embodiment (more specifically, the decision unit) does not limitedly decide the scanning pattern of the imaging device corresponding to the whole moving image by counting the decision results of the scanning pattern of the imaging device for the respective partitioned regions. For example, the image processing apparatus according to the fourth embodiment can also consider the individual scanning patterns of the imaging device for the respective partitioned regions as the decision results of the scanning pattern of the imaging device for the respective partitioned regions. Herein, when the correction unit (not shown) included by the image processing apparatus according to the fourth embodiment performs distortion correction using the above-mentioned decision results of the scanning pattern of the imaging device for the respective partitioned regions, the correction unit (not shown) may further correct a boundary part. The correction unit (not shown) corrects the boundary part by, for example, blending brightness values and the like in response to distances between centers and boundaries of the respective adjacent partitioned regions.

Image Processing Apparatus According to Fifth Embodiment

Figure 24:
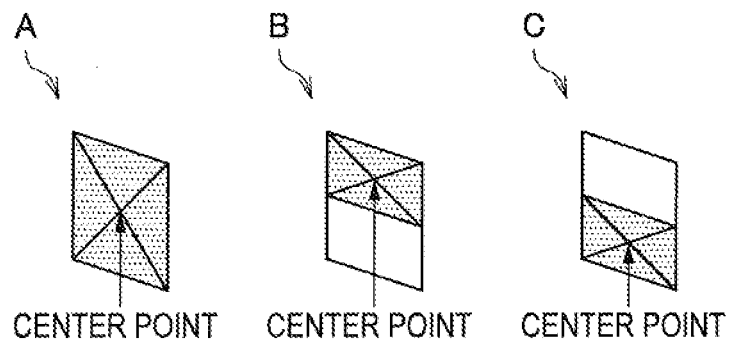
FIG. 24 is an explanatory drawing of center points in case of using a component separation equation indicated in Formula 3.

The image processing apparatus according to the present embodiments is not limited to the above-mentioned image processing apparatus according to the first embodiment to image processing apparatus according to the fourth embodiment. For example, the above-mentioned image processing apparatus according to the first embodiment to image processing apparatus according to the fourth embodiment (more specifically, the distortion component calculation units)

exemplarily calculate the distortion components and the like using the component separation expression indicated in Formula above. Herein, θ indicated in Formula 3 is a parameter relative to a center point in each frame as a reference. FIG. 24 is an explanatory drawing of the center point in the case of using the component separation expression indicated in Formula 3. As illustrated in FIG. 24, the center points (center coordinates) of the first region (portion A illustrated in FIG. 24), the second region (for example, portion B illustrated in FIG. 24) and the third region (for example, portion C illustrated in FIG. 24) in the case of using the component separation expression indicated in Formula 3 are different from one another. In other words, the above-mentioned image processing apparatus according to the first embodiment to image processing apparatus according to the fourth embodiment (more specifically, the distortion component calculation units) configure the different center points (center coordinates) for the first region, second region and third region, respectively, to calculate the distortion components.

However, the image processing apparatus according to the present embodiments (more specifically, the distortion component calculation unit) can also configure the identical center points (center coordinates) for the first region, second region and third region, respectively, to calculate the distortion components.

Figure 25:
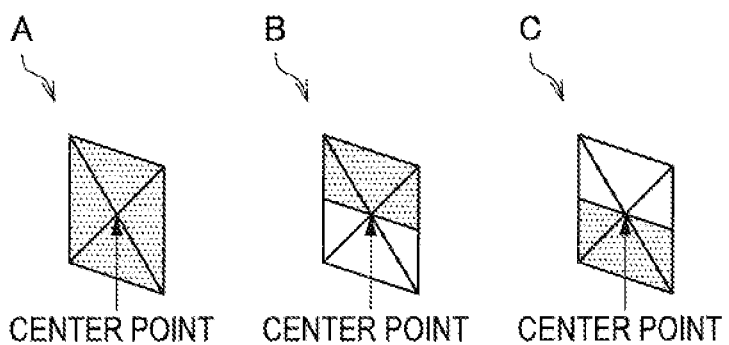
FIG. 25 is an explanatory drawing of one example of center points (center coordinates) configured by a distortion component calculation unit of an image processing apparatus according to a fifth embodiment.

FIG. 25 is an explanatory drawing of one example of the center points (center coordinates) configured by the distortion component calculation unit of an image processing apparatus according to a fifth embodiment. As illustrated in FIG. 25, the distortion component calculation unit of the image processing apparatus according to the fifth embodiment configures center points (center coordinates) of the first region (portion A illustrated in FIG. 25), the second region (for example, portion B illustrated in FIG. 25) and the third region (for example, portion C illustrated in FIG. 25) as identical.

Herein, even when configuring the identical center points (center coordinates) for the first region, second region and third region, respectively, the distortion components B and E detected based on the image signal are identical. Therefore, the processes in the distortion component calculation unit of image processing apparatus according to the fifth embodiment are basically similar to those in the above-mentioned distortion component calculation unit 102 according to the first embodiment. Meanwhile, the distortion component calculation unit of image processing apparatus according to the fifth embodiment performs the processes on a region corresponding to an upper frame (for example, the second region) using the component separation expression indicated in Formula 24 below, and performs the processes on a region corresponding to a lower frame (for example, the third region) using the component separation expression indicated in Formula 25 below.

$$\begin{pmatrix} x' \\ y' \\ 1 \end{pmatrix} = \begin{pmatrix} A_1 & A_2 & A_0 \\ B_1 & B_2 & B_0 \\ 0 & 0 & 1 \end{pmatrix} \begin{pmatrix} x \\ y \\ 1 \end{pmatrix} = \begin{pmatrix} 1 & 0 & h_c \\ 0 & 1 & 2v_c \\ 0 & 0 & 1 \end{pmatrix} \begin{pmatrix} \frac{1}{p} & 0 & 0 \\ 0 & 1 & 0 \\ 0 & 0 & 1 \end{pmatrix}$$
$$\begin{pmatrix} 1 & 0 & 0 \\ 0 & e & 0 \\ 0 & 0 & 1 \end{pmatrix} \begin{pmatrix} 1 & b & 0 \\ 0 & 1 & 0 \\ 0 & 0 & 1 \end{pmatrix} \begin{pmatrix} 1 & 0 & h \\ 0 & 1 & v \\ 0 & 0 & 1 \end{pmatrix} \begin{pmatrix} \cos\theta & -\sin\theta & 0 \\ \sin\theta & \cos\theta & 0 \\ 0 & 0 & 1 \end{pmatrix}$$
$$\begin{pmatrix} s & 0 & 0 \\ 0 & s & 0 \\ 0 & 0 & 1 \end{pmatrix} \begin{pmatrix} p & 0 & 0 \\ 0 & 1 & 0 \\ 0 & 0 & 1 \end{pmatrix} \begin{pmatrix} 1 & 0 & -h_c \\ 0 & 1 & -2v_c \\ 0 & 0 & 1 \end{pmatrix} \begin{pmatrix} x \\ y \\ 1 \end{pmatrix}$$
(Formula 24)

$$\begin{pmatrix} x' \\ y' \\ 1 \end{pmatrix} = \begin{pmatrix} A_1 & A_2 & A_0 \\ B_1 & B_2 & B_0 \\ 0 & 0 & 1 \end{pmatrix} \begin{pmatrix} x \\ y \\ 1 \end{pmatrix} = \begin{pmatrix} 1 & 0 & h_c \\ 0 & 1 & 0 \\ 0 & 0 & 1 \end{pmatrix} \begin{pmatrix} \frac{1}{p} & 0 & 0 \\ 0 & 1 & 0 \\ 0 & 0 & 1 \end{pmatrix}$$
$$\begin{pmatrix} 1 & 0 & 0 \\ 0 & e & 0 \\ 0 & 0 & 1 \end{pmatrix} \begin{pmatrix} 1 & b & 0 \\ 0 & 1 & 0 \\ 0 & 0 & 1 \end{pmatrix} \begin{pmatrix} 1 & 0 & h \\ 0 & 1 & v \\ 0 & 0 & 1 \end{pmatrix} \begin{pmatrix} \cos\theta & -\sin\theta & 0 \\ \sin\theta & \cos\theta & 0 \\ 0 & 0 & 1 \end{pmatrix}$$
$$\begin{pmatrix} s & 0 & 0 \\ 0 & s & 0 \\ 0 & 0 & 1 \end{pmatrix} \begin{pmatrix} p & 0 & 0 \\ 0 & 1 & 0 \\ 0 & 0 & 1 \end{pmatrix} \begin{pmatrix} 1 & 0 & -h_c \\ 0 & 1 & 0_c \\ 0 & 0 & 1 \end{pmatrix} \begin{pmatrix} x \\ y \\ 1 \end{pmatrix}$$
(Formula 25)

Moreover, the image processing apparatus according to the fifth embodiment may switch from "configuring the different center points (center coordinates) for the first region, second region and third region, respectively" to "configuring the identical center points (center coordinates) for the first region, second region and third region, respectively" or vice versa, for example, in response to the settings of the mode as illustrated in portion B of FIG. 20B. For example, the image processing apparatus according to the fifth embodiment configures the identical center points (center coordinates) for the first region, second region and third region, respectively, in the case of the setting of the "strong mode". Moreover, the image processing apparatus according to the fifth embodiment configures, for example, the different center points (center coordinates) for the first region, second region and third region, respectively, in the case of the setting of the "weak mode".

Image Processing Apparatus According to Sixth Embodiment

The image processing apparatus according to the present embodiments is not limited to the above-mentioned image processing apparatus according to the first embodiment to image processing apparatus according to the fifth embodiment. For example, the decision unit of the above-mentioned image processing apparatus according to the first embodiment to image processing apparatus according to the fifth embodiment exemplarily performs the decision using only the distortion components calculated in the distortion component calculation unit, whereas the processes in the image processing apparatus according to the present embodiments is not limited to the above. For example, the decision unit of the image processing apparatus according to the present embodiments may selectively correct the distortion components calculated in the distortion component calculation unit based on the motion components calculated in the distortion component calculation unit to perform the decision.

Figure 26:
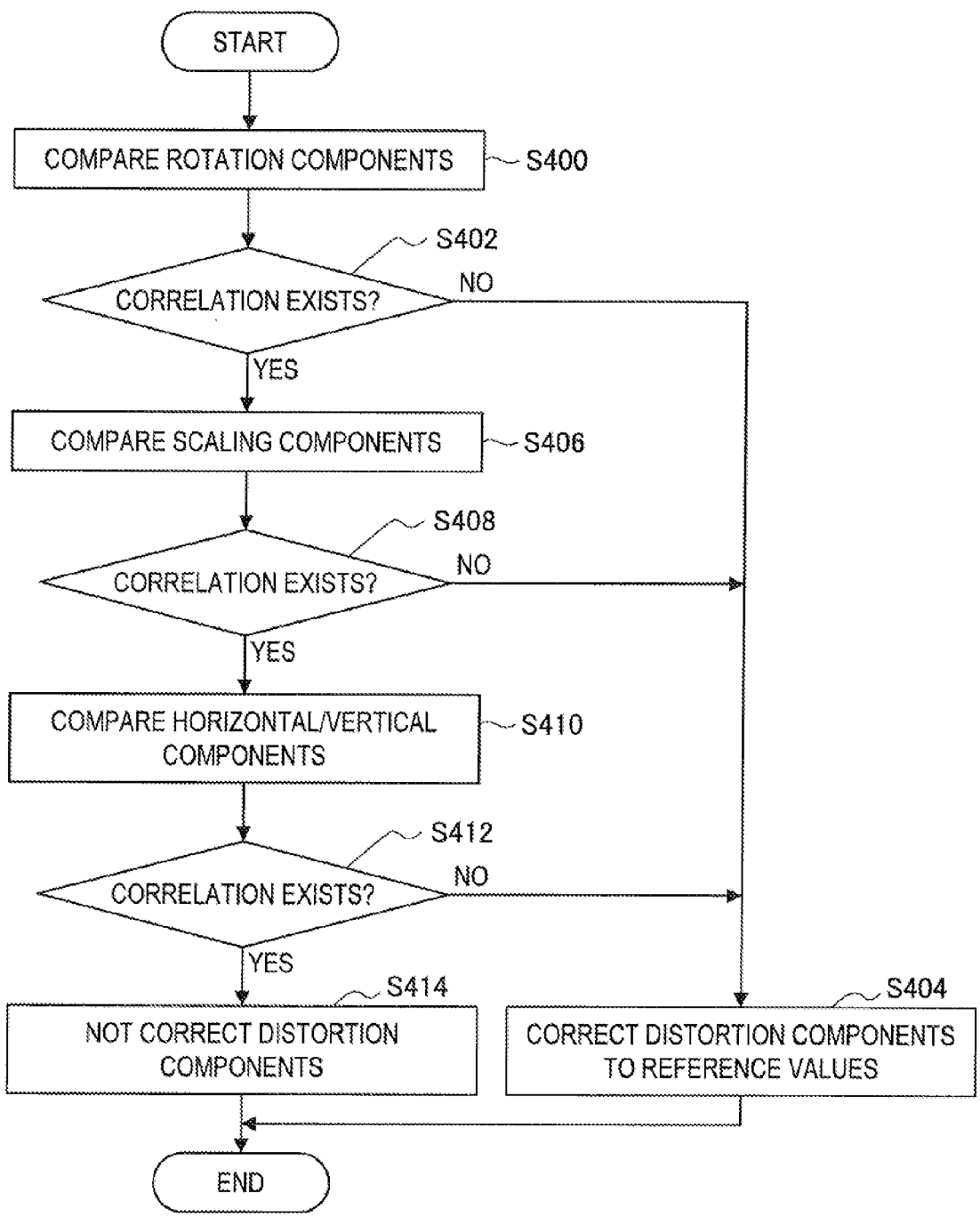
FIG. 26 is a flowchart illustrating one example of processes in a decision unit of an image processing apparatus according to a sixth embodiment.

FIG. 26 is a flowchart illustrating one example of processes in the decision unit of the image processing apparatus according to the sixth embodiment. Herein, FIG. 26 illustrates one example of selective correction processes of the distortion components in the decision unit. Moreover, the processes illustrated in FIG. 26 are performed for each one frame.

The decision unit compares rotation components (one kind of the motion components) corresponding to the first region, second region and third region, respectively (S400). More specifically, the decision unit specifies a maximum value and a minimum value of the rotation components corresponding to, for example, the first region, second region and third region, respectively, to subtract the minimum value from the maximum value thus specified. Hereinafter, the value calculated by the subtraction in step S400 is indicated as a "first subtraction value".

After the process in step S400, the decision unit decides whether or not there is a correlation between the rotation components (S402). Herein, the decision unit compares, for example, a predetermined threshold value according to the rotation components with the first subtraction value calculated in step S400, and decides, when the first subtraction value is equal to or greater than the threshold value (or larger than the threshold value), that there is the correlation between the rotation components.

When it is not decided that there is the correlation in step S402, the decision unit corrects the distortion components to reference values (S404). Then, the decision unit performs the processes illustrated in FIG. 16. Herein, the reference value of the distortion components can be, for example, "0" for B and "1" for E.

Moreover, when it is decided that there is the correlation in step S402, the decision unit compares scaling components (expansion and contraction components, one kind of the motion components) (S406). More specifically, the decision unit specifies a maximum value and a minimum value of the scaling components corresponding to, for example, the first region, second region and third region, respectively, to subtract the minimum value from the maximum value thus specified. Hereinafter, the value calculated by the subtraction in step S406 is indicated as a "second subtraction value".

After the process in step S406, the decision unit decides whether or not there is a correlation between the scaling components (S408). Herein, the decision unit compares, for example, a predetermined threshold value according to the scaling components with the second subtraction value calculated in step S406 similarly to step S402, and decides, when the second subtraction value is equal to or greater than the threshold value (or larger than the threshold value), that there is the correlation between the scaling components.

When it is not decided that there is the correlation in step S408, the decision unit corrects the distortion components to the reference values (S404). Then, the decision unit performs the processes illustrated in FIG. 16.

Moreover, when it is decided that there is the correlation in step S408, the decision unit compares horizontal/vertical components (one kind of the motion components) (S410). More specifically, the decision unit specifies a maximum value and a minimum value of the horizontal/vertical components corresponding to, for example, the first region, second region and third region, respectively, to subtract the minimum value from the maximum value thus specified. Hereinafter, the value calculated by the subtraction in step S410 is indicated as a "third subtraction value".

After the process in step S410, the decision unit decides whether or not there is a correlation between horizontal/vertical components (S412). Herein, the decision unit compares, for example, a predetermined threshold value according to the horizontal/vertical components with the third subtraction value calculated in step S410 similarly to step S402, and decides, when the third subtraction value is equal to or greater than the threshold value (or larger than the threshold value), that there is the correlation between the horizontal/vertical components.

When it is not decided that there is the correlation in step S412, the decision unit corrects the distortion components to the reference values (S404). Then, the decision unit performs the processes illustrated in FIG. 16.

Moreover, when it is decided that there in the correlation in step S412, the decision unit does not correct the distortion components (S414) and performs the processes illustrated in FIG. 16.

The decision unit of image processing apparatus according to the sixth embodiment selectively corrects the distortion components by, for example, performing the processes illustrated in FIG. 26. Herein, the decision unit according to the sixth embodiment corrects the distortion components to the reference values when there is no correlation between each kind of the motion components, because there is a risk that the calculated distortion components can include an error when there is no correlation between the motion components.

Therefore, the decision unit according to the sixth embodiment can decide the scanning pattern of the imaging device based on the image signal more accurately by, for example, performing the processes illustrated in FIG. 26. In addition, the selective correction processes of the distortion components in the decision unit according to the sixth embodiment are, of course, not limited to the processes illustrated in FIG. 26.

Image Processing Apparatus According to Seventh Embodiment

The image processing apparatus according to the present embodiments can be configured to include a combination of any embodiments of the above-mentioned image processing apparatus according to the first embodiment to image processing apparatus according to the sixth embodiment.

As above, the image processing apparatus according to the present embodiments performs, for example, the processes of item (I) above (distortion component calculation processes) and the processes of item (II) above (decision processes). Herein, the image processing apparatus according to the present embodiments decides the scanning pattern of the imaging device by, for example, comparing the data indicating the results of correlation of distortion for individual scanning patterns of the known imaging devices (for example, the table illustrated in FIG. 19) with the results of correlation based on the distortion components calculated based on the image signal. Therefore, the image processing apparatus according to the present embodiments can decide the scanning pattern of the imaging device based on the image signal more accurately.

In the above, the image processing apparatuses are exemplarily described as the present embodiments, whereas the present embodiments are not limited to such embodiments. The present embodiments can be applied to, for example, various instruments capable of processing image signals such as image capturing devices such as a digital camera, a computer such as a PC (Personal Computer) and a server, a display device such as a television receiver, a communication device such as a mobile phone, a video/music playback device (or video/music recording and playback device) and a game machine. Moreover, the present embodiments can be also applied to, for example, image processing ICs (Integrated Circuits) capable of being integrated with the instruments as above.

Program According to Present Embodiments

A program causing a computer to function as the image processing apparatus according to the present embodiments (for example, a program enabling execution of processes according to the image processing method according to the present embodiments such as the processes of item (I) above (distortion component calculation processes) and the processes of item (II) above (decision processes)) can realize the decision of the scanning pattern of the imaging device having captured the moving image based on the image signal which indicates the moving image.

It should be understood by those skilled in the art that various modifications, combinations, sub-combinations and alterations may occur depending on design requirements and other factors insofar as they are within the scope of the appended claims or the equivalents thereof.

For example, in the above, it is described that there is provided a program (computer program) causing a computer to function as the image processing apparatus according to the present embodiments, whereas there can be further provided a recording medium storing the above-mentioned program as well according to the present embodiments.

The above-mentioned configuration presents one example of the present embodiments and is, of course, within the technical scope of the present disclosure.

Additionally, the present technology may also be configured as below.

(1) An image processing apparatus including:
a distortion component calculation unit calculating a distortion component in a time series, based on an image signal indicating a moving image composed of a frame image, for each of a first region corresponding to the whole frame image, a second region corresponding to one region obtained by dividing the frame image, and a third region corresponding to the other region obtained by dividing the frame image; and
a decision unit deciding a scanning pattern of an imaging device having captured the moving image, which the image signal indicates, based on a combination of a correlation of distortion between the second region and the first region and a correlation of distortion between the second region and the third region.

(2) The image processing apparatus according to (1), wherein
the decision unit performs, based on a user operation onto a selection screen causing a user to select a decision accuracy, the decision in response to the selected decision accuracy.

(3) The image processing apparatus according to (1) or (2), wherein
the distortion component calculation unit calculates the distortion component based on sequential frame images of an entirety of the moving image or a part of the moving image.

(4) The image processing apparatus according to any one of (1) to (3), wherein
the distortion component calculation unit sets a region from which a partial region of the frame image is excluded as the first region.

(5) The image processing apparatus according to any one of (1) to (4), wherein
the distortion component calculation unit calculates the distortion component based on any one of the frame image at an odd frame in the moving image or the frame image at an even frame in the moving image.

(6) The image processing apparatus according to any one of (1) to (4), wherein
the distortion component calculation unit calculates the distortion component by inverting any one of the frame image at an odd frame in the moving image or the frame image at an even frame in the moving image.

(7) The image processing apparatus according to any one of (1) to (6), wherein
the distortion component calculation unit calculates a distortion component for each of a fourth region corresponding to an entirety of one partitioned region obtained by dividing the frame image, a fifth region corresponding to one region obtained by dividing the partitioned region, and a sixth region corresponding to another region obtained by dividing the partitioned region, and
the decision unit decides a scanning pattern of an imaging device having captured the moving image based on a decision result of the scanning pattern, for each partitioned region, decided based on a combination of a correlation of distortion between the fifth region and the fourth region and a correlation of distortion between the fifth region and the sixth region.

(8) The image processing apparatus according to any one of (1) to (6), wherein
the distortion component calculation unit calculates the distortion component by setting different center coordinates for the first region, the second region, and the third region, respectively.

(9) The image processing apparatus according to any one of (1) to (6), wherein
the distortion component calculation unit calculates the distortion component by setting identical center coordinates for the first region, the second region, and the third region, respectively.

(10) The image processing apparatus according to any one of (1) to (6), wherein
the distortion component calculation unit further calculates a motion component in a time series for each of the first region, the second region, and the third region, and
the decision unit selectively corrects the distortion component calculated based on the calculated motion component to perform the decision.

(11) An image processing method including:
calculating a distortion component in a time series, based on an image signal indicating a moving image composed of a frame image, for each of a first region corresponding to the whole frame image, a second region corresponding to one region obtained by dividing the frame image, and a third region corresponding to the other region obtained by dividing the frame image; and
deciding a scanning pattern of an imaging device having captured the moving image, which the image signal indicates, based on a combination of a correlation of distortion between the second region and the first region and a correlation of distortion between the second region and the third region.

(12) A program for causing a computer to execute:
calculating a distortion component in a time series, based on an image signal indicating a moving image composed of a frame image, for each of a first region corresponding to the whole frame image, a second region corresponding to one region obtained by dividing the frame image, and a third region corresponding to the other region obtained by dividing the frame image; and
deciding a scanning pattern of an imaging device having captured the moving image, which the image signal indicates, based on a combination of a correlation of distortion between the second region and the first region and a correlation of distortion between the second region and the third region.

What is claimed is:
1. An image processing apparatus comprising:
a distortion component calculation unit for calculating a distortion component for each of a first region corresponding to a whole region of a frame image, a second region corresponding to an upper half region obtained by dividing the frame image, and a third region corresponding to a lower half region obtained by dividing the frame image, wherein the frame image is based on an image signal indicating a moving image; and a decision unit for deciding a scanning pattern of an imaging device having captured the moving image, based on a combination of a correlation of distortion between the second region and the first region, and a correlation of distortion between the second region and the third region.

2. The image processing apparatus according to claim 1, wherein
the decision unit performs a decision based on a user selection of a decision accuracy on a selection screen.

3. The image processing apparatus according to claim 1, wherein
the distortion component calculation unit calculates the distortion component based on sequential frame images of an entirety of the moving image or sequential frame images of a part of the moving image.

4. The image processing apparatus according to claim 1, wherein
the distortion component calculation unit excludes a partial region of the frame image to set the first region.

5. The image processing apparatus according to claim 1, wherein
the distortion component calculation unit calculates the distortion component based on the frame image at an odd frame in the moving image, or the frame image at an even frame in the moving image.

6. The image processing apparatus according to claim 1, wherein
the distortion component calculation unit calculates the distortion component by inverting the frame image at an odd frame in the moving image, or the frame image at an even frame in the moving image.

7. The image processing apparatus according to claim 1, wherein
the distortion component calculation unit calculates a distortion component for each of a fourth region corresponding to an entirety of the second region, a fifth region corresponding to an upper half region obtained by dividing the second region, and a sixth region corresponding to a lower half region obtained by dividing the second region, and
the decision unit decides a scanning pattern of the imaging device having captured the moving image, based on a combination of a correlation of distortion between the fifth region and the fourth region, and a correlation of distortion between the fifth region and the sixth region.

8. The image processing apparatus according to claim 1, wherein
the distortion component calculation unit calculates the distortion component by setting different center coordinates for each of the first region, the second region, and the third region.

9. The image processing apparatus according to claim 1, wherein
the distortion component calculation unit calculates the distortion component by setting identical center coordinates for each of the first region, the second region, and the third region.

10. The image processing apparatus according to claim 1, wherein
the distortion component calculation unit further calculates a motion component for each of the first region, the second region, and the third region, and
the decision unit selectively corrects the distortion component for each of the first region, the second region, and the third region, based on corresponding motion component to decide the scanning pattern.

11. An image processing method comprising:
calculating a distortion component for each of a first region corresponding to a whole region of a frame image, a second region corresponding to an upper half region obtained by dividing the frame image, and a third region corresponding to a lower half region obtained by dividing the frame image, wherein the frame image is based on an image signal indicating a moving image; and
deciding a scanning pattern of an imaging device having captured the moving image, based on a combination of a correlation of distortion between the second region and the first region, and a correlation of distortion between the second region and the third region.

12. A non-transitory computer readable storage medium having stored thereon, a computer program, the computer program when executed by a computer causes the computer to perform steps comprising:
calculating a distortion component for each of a first region corresponding to a whole region of a frame image, a second region corresponding to an upper half region obtained by dividing the frame image, and a third region corresponding to a lower half region obtained by dividing the frame image; and
deciding a scanning pattern of an imaging device having captured the moving image, based on a combination of a correlation of distortion between the second region and the first region, and a correlation of distortion between the second region and the third region.

13. The image processing apparatus according to claim 1, wherein
the decision unit determines a positive correlation of distortion between the second region and the first region, when a ratio between the distortion component of the first region and the second region is equal to or greater than a predetermined threshold.

14. The image processing apparatus according to claim 1, wherein
the decision unit determines a negative correlation of distortion between the second region and the first region, when a ratio between the distortion component of the first region and the second region is less than a predetermined threshold.

* * * * *